US011090711B2

(12) United States Patent
Golfetto

(10) Patent No.: US 11,090,711 B2
(45) Date of Patent: Aug. 17, 2021

(54) METHOD OF FREEZE DRYING

(71) Applicant: META-DRY LLC, Farmington Hills, MI (US)

(72) Inventor: Michael Golfetto, Farmington Hills, MI (US)

(73) Assignee: META-DRY LLC, Farmington Hills, MI (US)

( * ) Notice: Subject to any disclaimer, the term of this patent is extended or adjusted under 35 U.S.C. 154(b) by 96 days.

(21) Appl. No.: 15/956,252

(22) Filed: Apr. 18, 2018

(65) Prior Publication Data

US 2018/0274856 A1 Sep. 27, 2018

Related U.S. Application Data

(63) Continuation-in-part of application No. PCT/US2017/030216, filed on Apr. 28, 2017, and a
(Continued)

(51) Int. Cl.
*B22C 7/02* (2006.01)
*B01D 12/00* (2006.01)
(Continued)

(52) U.S. Cl.
CPC .............. *B22C 7/026* (2013.01); *B01D 3/00* (2013.01); *B01D 12/00* (2013.01);
(Continued)

(58) Field of Classification Search
CPC ........ F26B 2210/16; F26B 3/04; A61L 27/56; C08J 9/28
See application file for complete search history.

(56) References Cited

U.S. PATENT DOCUMENTS 3,025,680 A 3/1962 Brosse et al.
3,113,032 A 12/1963 Wayne
(Continued)

FOREIGN PATENT DOCUMENTS

CN 1490582 A 4/2004
DE 102008022754 A1 11/2009
(Continued)

OTHER PUBLICATIONS

Kang et al, Nanotube Aerogel Sheet Flutter for Actuation, Power Generation, and Infrasound Detection, Nature, Aug. 18, 2014, available at: https://www.nature.com/articles/srep06105.
(Continued)

*Primary Examiner* — Jason Lau
(74) *Attorney, Agent, or Firm* — Dickinson Wright PLLC

(57) ABSTRACT

A method of freeze-drying comprising rapidly freezing either liquid or supercritical carbon dioxide in and around a material having pores at a rate of at least 0.2° C./min to limit the size of crystals formed from the carbon dioxide so as to avoid the formation of gas bubbles and damage to the pores and exposure of the material to gas-liquid interfaces. During freezing a solid layer primarily of solid carbon dioxide is formed on and surrounding the material by transferring heat with a cryogenic liquid circulating about the material. This solid layer protects the material from gas-liquid interfaces and surface tension before decreasing pressure about the material by venting carbon dioxide.

17 Claims, 20 Drawing Sheets

Related U.S. Application Data continuation-in-part of application No. PCT/US2016/059611, filed on Oct. 29, 2016.

(60) Provisional application No. 62/248,162, filed on Oct. 29, 2015, provisional application No. 62/248,194, filed on Oct. 29, 2015.

(51) Int. Cl.

| | | |
|---|---|---|
| *C01B 33/158* | (2006.01) | |
| *B29C 67/20* | (2006.01) | |
| *F26B 5/06* | (2006.01) | |
| *B01D 3/00* | (2006.01) | |
| *B01J 13/00* | (2006.01) | |
| *B22D 25/00* | (2006.01) | |
| *B29C 35/16* | (2006.01) | |
| *C08J 9/22* | (2006.01) | |
| *B82Y 30/00* | (2011.01) | |

(52) U.S. Cl.
CPC ....... *B01J 13/0065* (2013.01); *B01J 13/0091* (2013.01); *B22D 25/005* (2013.01); *B29C 35/16* (2013.01); *B29C 67/202* (2013.01); *B29C 67/207* (2013.01); *C01B 33/1585* (2013.01); *C08J 9/22* (2013.01); *F26B 5/06* (2013.01); *B82Y 30/00* (2013.01); *C08J 2205/026* (2013.01); *Y02P 20/54* (2015.11); *Y10T 428/12014* (2015.01); *Y10T 428/12049* (2015.01)

(56) References Cited

U.S. PATENT DOCUMENTS

| | | | |
|---|---|---|---|
| 3,579,360 A * | 5/1971 | Chauffard | A21D 6/001 |
| | | | 426/385 |
| 5,078,919 A * | 1/1992 | Ashley | C09K 11/04 |
| | | | 250/361 R |
| 5,156,895 A | 10/1992 | Martin | |
| 5,190,987 A | 3/1993 | Parkinson | |
| 5,275,796 A | 1/1994 | Tillotson et al. | |
| 5,443,746 A | 8/1995 | Harris et al. | |
| 5,851,947 A | 12/1998 | Hair et al. | |
| 5,993,917 A * | 11/1999 | Pan | B29C 44/56 |
| | | | 427/244 |
| 6,627,669 B2 | 9/2003 | Mukherjee et al. | |
| 6,704,192 B2 | 3/2004 | Pekala | |
| 6,887,563 B2 | 5/2005 | Frank et al. | |
| 7,071,287 B2 | 7/2006 | Rhine et al. | |
| 7,074,880 B2 | 7/2006 | Rhine et al. | |
| 7,078,359 B2 | 7/2006 | Stepanian et al. | |
| 7,258,873 B2 | 8/2007 | Truong-Le et al. | |
| 7,560,062 B2 | 7/2009 | Gould et al. | |
| 9,136,536 B2 | 9/2015 | Grigorian et al. | |
| 9,260,581 B2 | 2/2016 | Leventis et al. | |
| 9,276,190 B2 | 3/2016 | Pen | |
| 9,381,471 B2 | 7/2016 | Pénicaud | |
| 9,449,723 B2 | 9/2016 | Park et al. | |
| 9,522,358 B2 | 12/2016 | Zhang et al. | |
| 9,593,225 B2 | 3/2017 | Leventis et al. | |
| 2002/0086977 A1* | 7/2002 | Lai | C07K 17/08 |
| | | | 530/350 |
| 2007/0125700 A1* | 6/2007 | Ding | B01D 39/1607 |
| | | | 210/490 |
| 2007/0135528 A1* | 6/2007 | Butler | A61L 27/56 |
| | | | 521/61 |
| 2008/0287561 A1 | 11/2008 | Menashi et al. | |
| 2008/0311398 A1 | 12/2008 | Bauer et al. | |
| 2009/0075382 A1* | 3/2009 | Sachlos | A61L 27/46 |
| | | | 435/398 |
| 2009/0226700 A1 | 9/2009 | Ratke et al. | |
| 2011/0250428 A1 | 10/2011 | Leventis et al. | |
| 2012/0134909 A1 | 5/2012 | Leventis et al. | |
| 2012/0175012 A1 | 7/2012 | Goodwin et al. | |
| 2013/0022769 A1 | 1/2013 | Sabri et al. | |
| 2013/0123179 A1* | 5/2013 | Gupta | A61K 9/0056 |
| | | | 514/10.9 |
| 2014/0128488 A1 | 5/2014 | Lotti et al. | |
| 2014/0350134 A1 | 11/2014 | Rodman et al. | |
| 2015/0141533 A1 | 5/2015 | Joshi et al. | |
| 2016/0280877 A1 | 9/2016 | Kim et al. | |
| 2017/0050990 A1 | 2/2017 | Leventis et al. | |
| 2017/0096548 A1 | 4/2017 | Kim et al. | |
| 2018/0036713 A1* | 2/2018 | Li | C08B 15/02 |

FOREIGN PATENT DOCUMENTS

| | | |
|---|---|---|
| EP | 0254778 A1 | 2/1988 |
| EP | 1306148 B1 | 9/2006 |
| EP | 1952908 B1 | 1/2013 |
| WO | 2015065557 A1 | 5/2015 |
| WO | 2016127084 A1 | 8/2016 |
| WO | 2016161123 A1 | 10/2016 |
| WO | 2017087511 A1 | 5/2017 |

OTHER PUBLICATIONS

Lin et al, Synthesis of Amine-Modified Aerogel Sorbents and Metal-Organic Framework-5 (MOF-5) Membranes for Carbon Dioxide Separation, Arizona State University, Dec. 2010, available at: https://www.researchgate.net/profile/Robert_Pfeffer/publication/267250357_Synthesis_of_Amine-Modified_Aerogel_Sorbents_and_Metal-_Organic_Framework-5_MOF-5_Membranes_for_Carbon_Dioxide_Separation/links/55a6884a08aeb4e8e6469952/Synthesis-of-Amine-Modified-Aerogel-Sorbents-and-Metal-Organic-Framework-5-MOF-5-Membranes-for-Carbon-Dioxide-Separation.pdf.

* cited by examiner

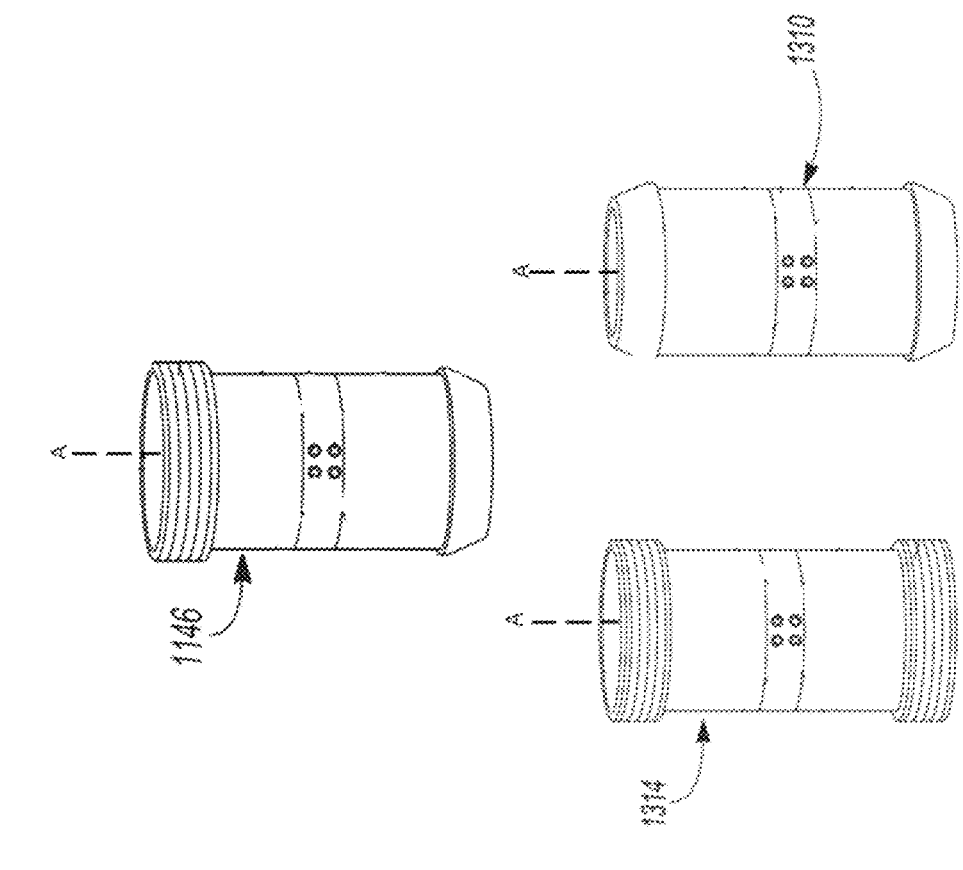
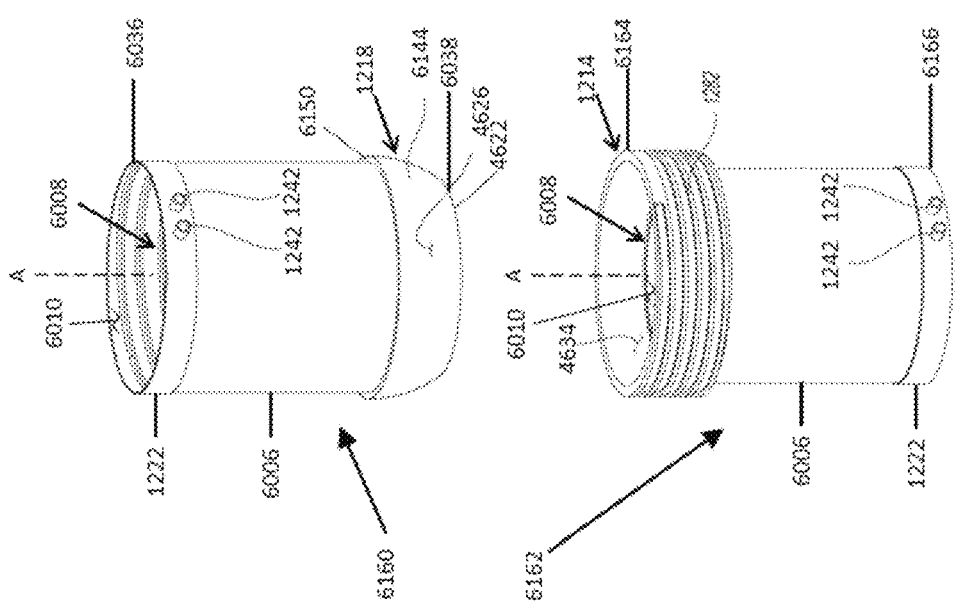
FIG. 2

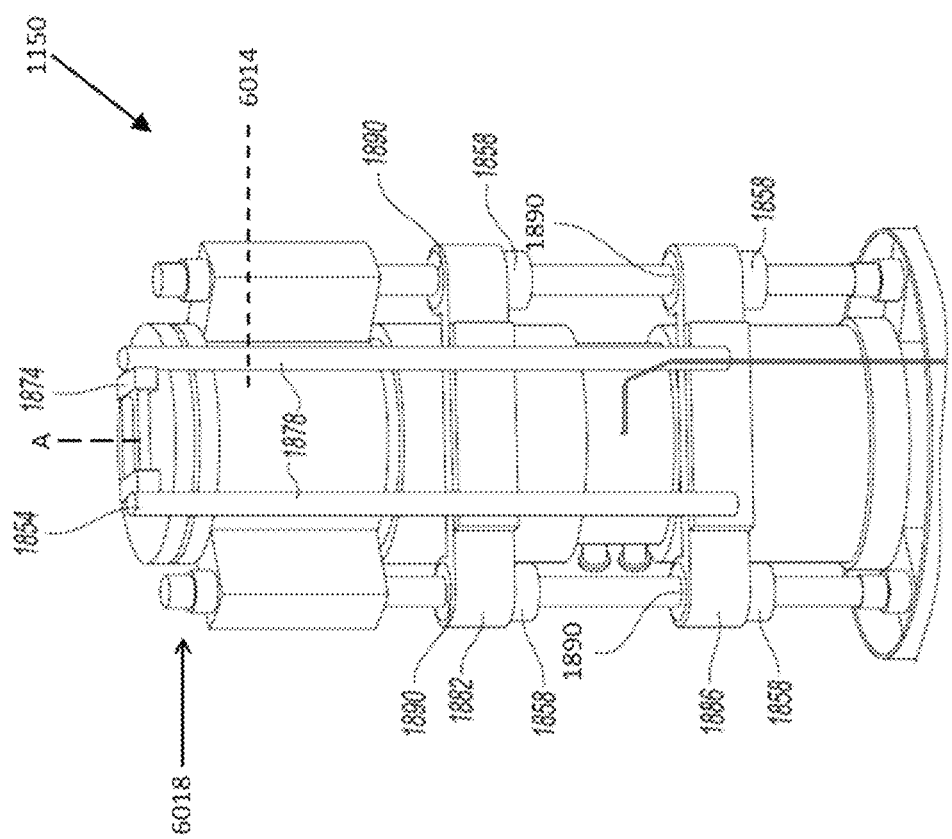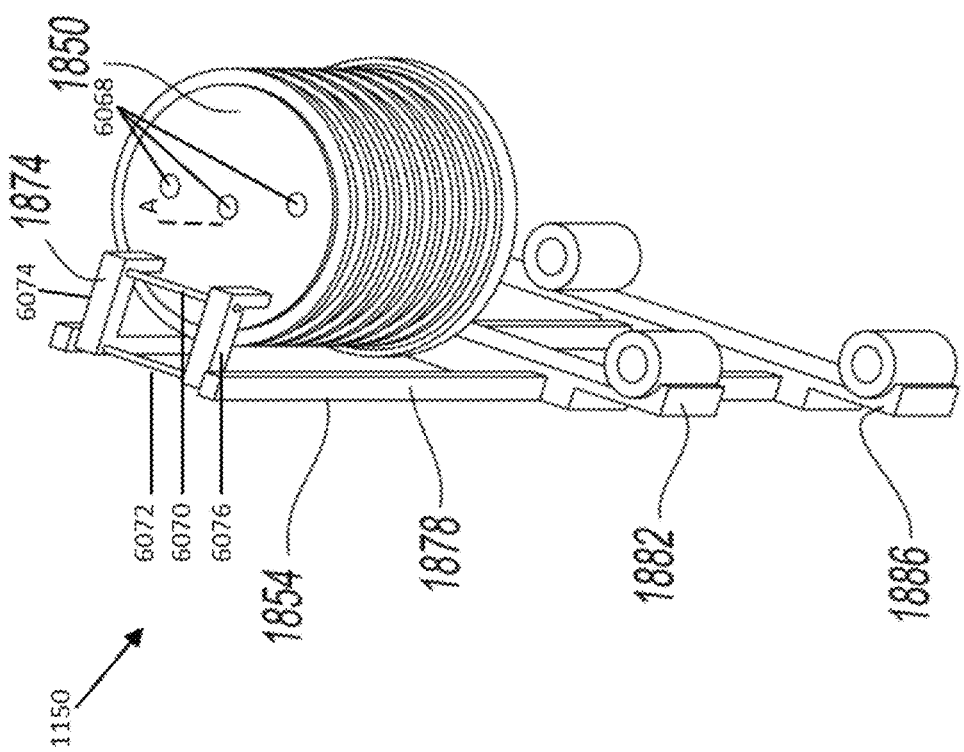
FIG. 8

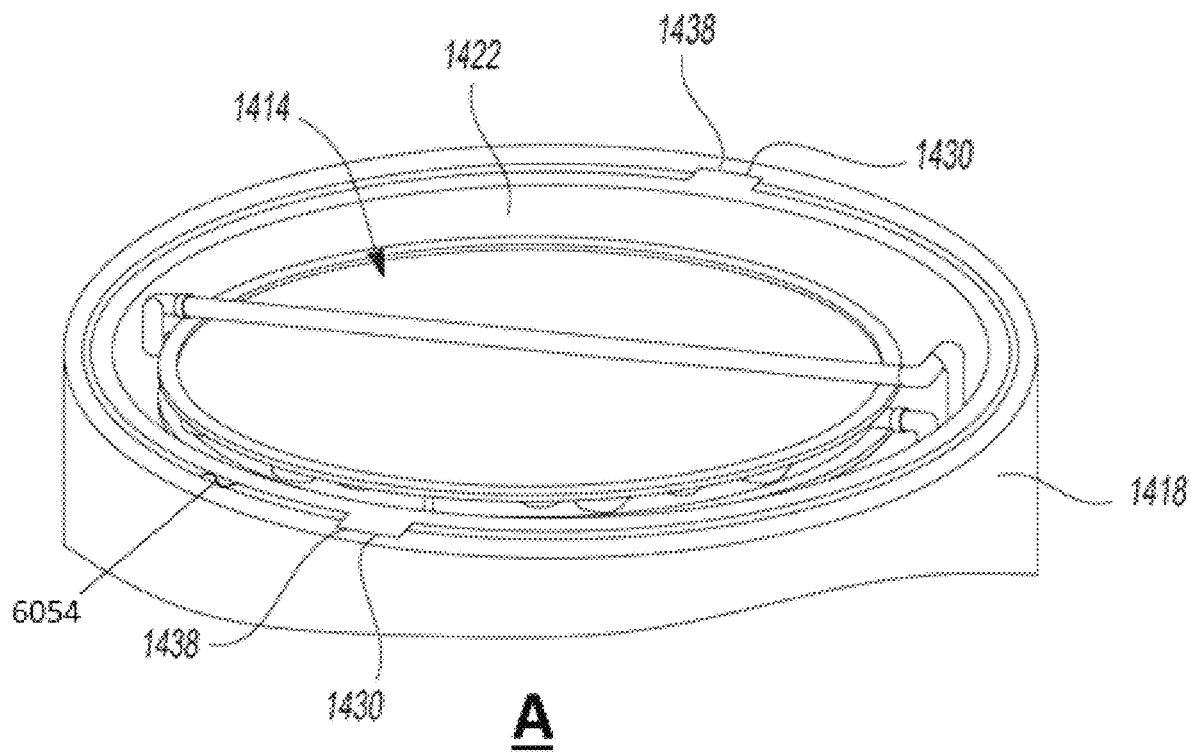
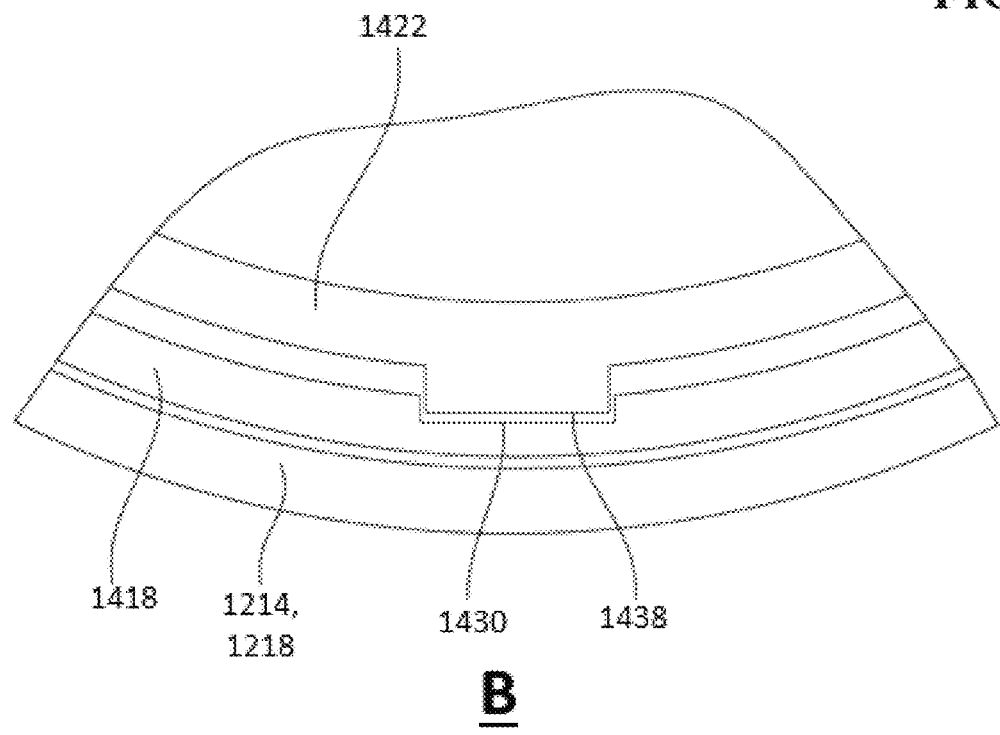
FIG. 12

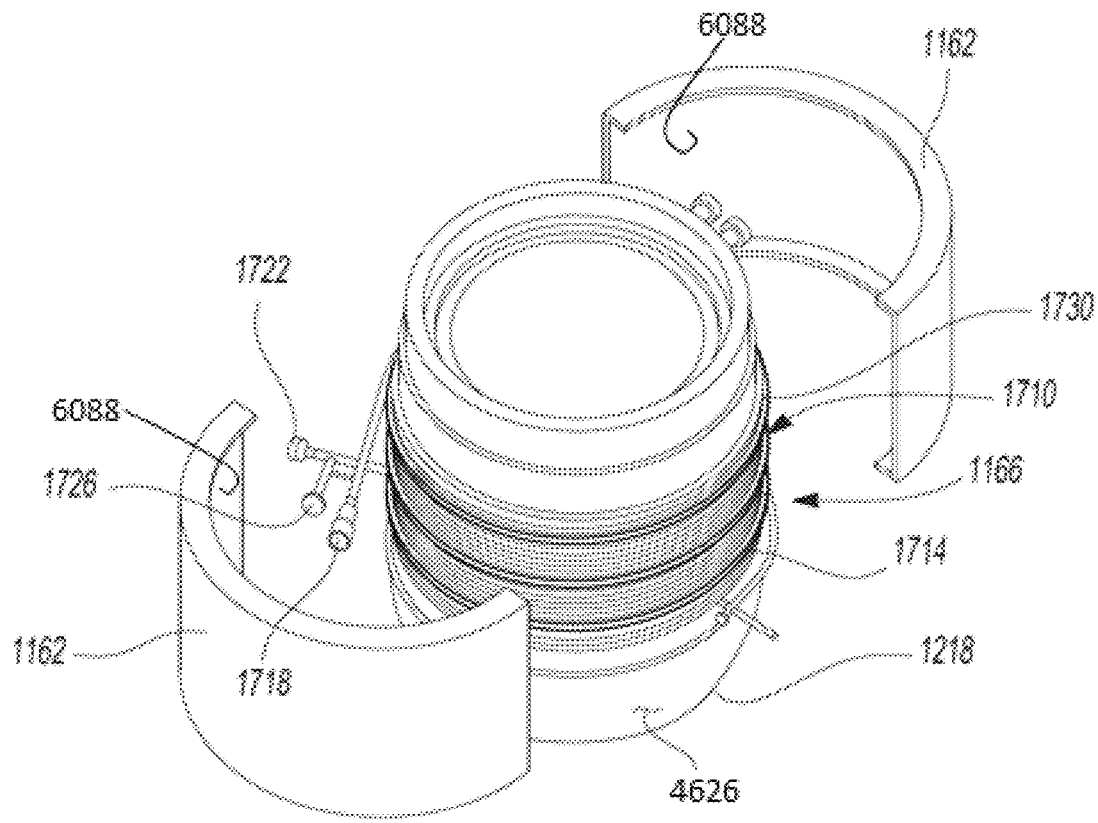
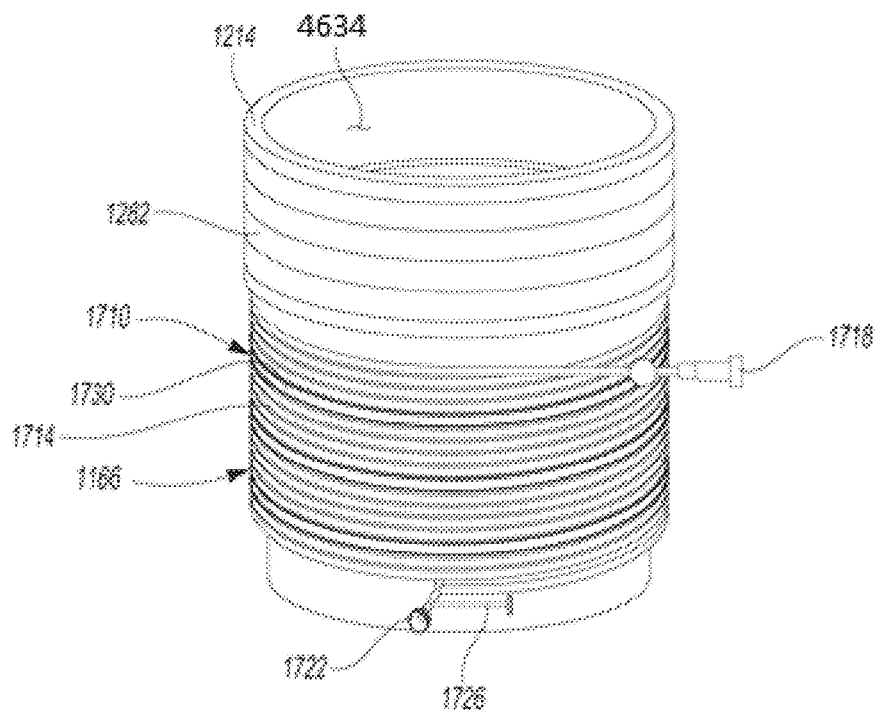
FIG. 14

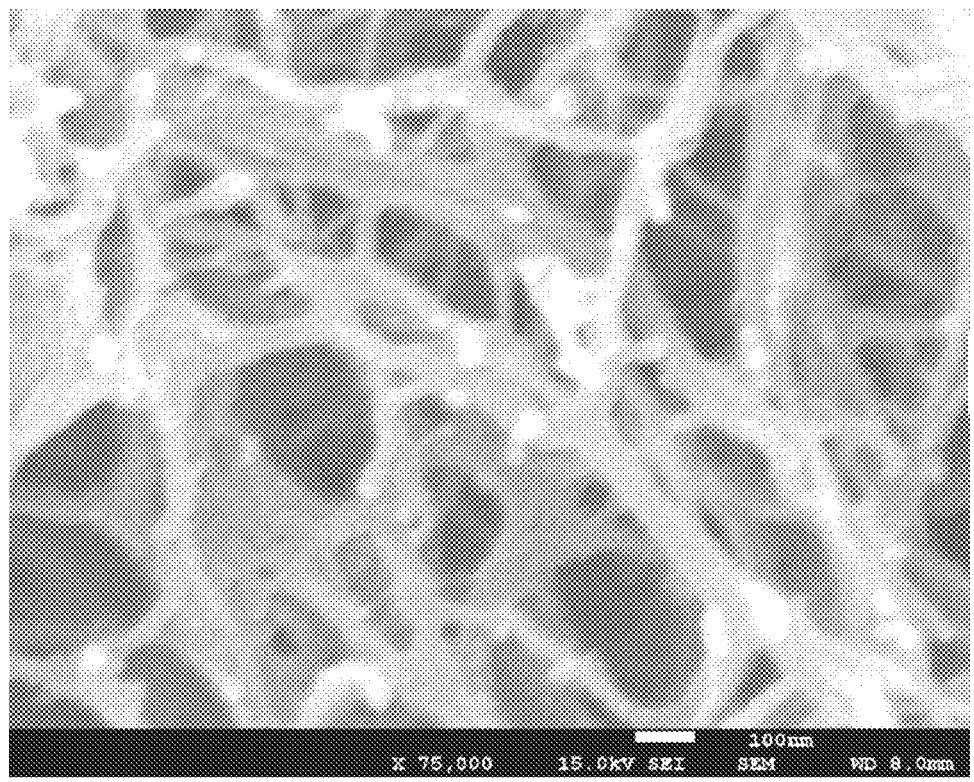
FIG. 18
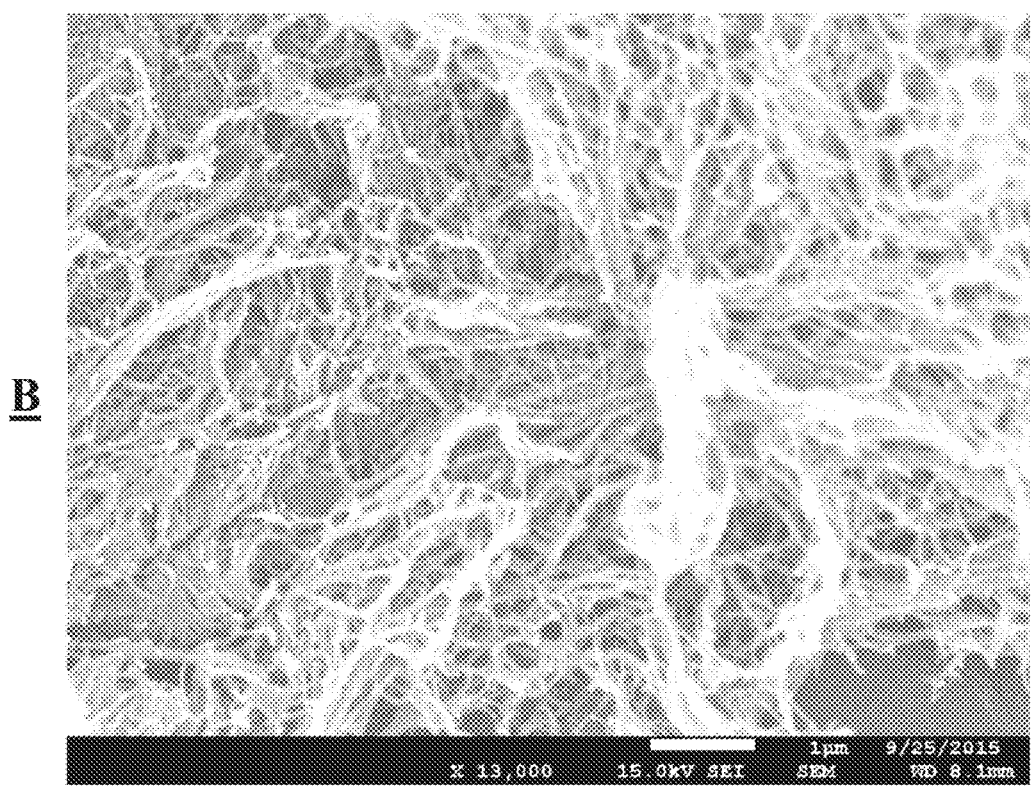

Summary Report

Surface Area t-Plot External Surface Area: 161.2937 m²/g

BJH Adsorption cumulative surface area of pores
between 17.000 Å and 3,000.000 Å width: 135.536 m²/g BJH Desorption cumulative surface area of pores
between 17.000 Å and 3,000.000 Å width: 166.4198 m²/g D-H Adsorption cumulative surface area of pores
between 17.000 Å and 3,000.000 Å width: 145.522 m²/g D-H Desorption cumulative surface area of pores
between 17.000 Å and 3,000.000 Å width: 162.5959 m²/g

Pore Volume t-Plot micropore volume: 0.004728 cm³/g

BJH Adsorption cumulative volume of pores
between 17.000 Å and 3,000.000 Å width: 0.218827 cm³/g

FIG. 19

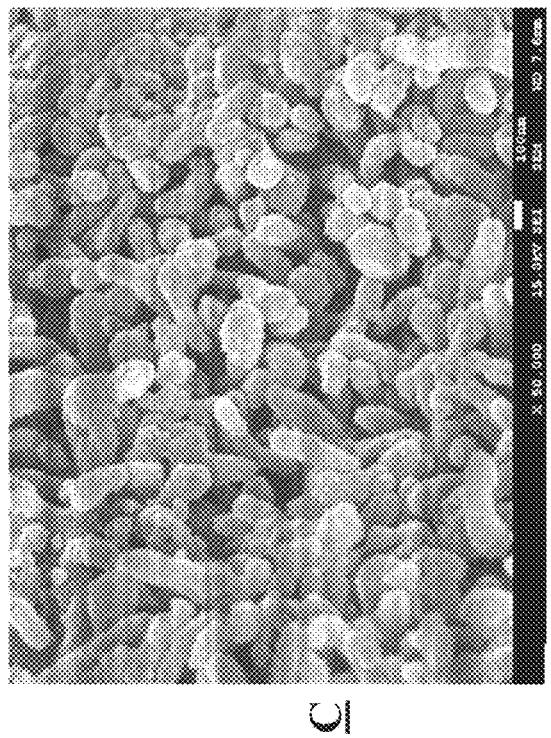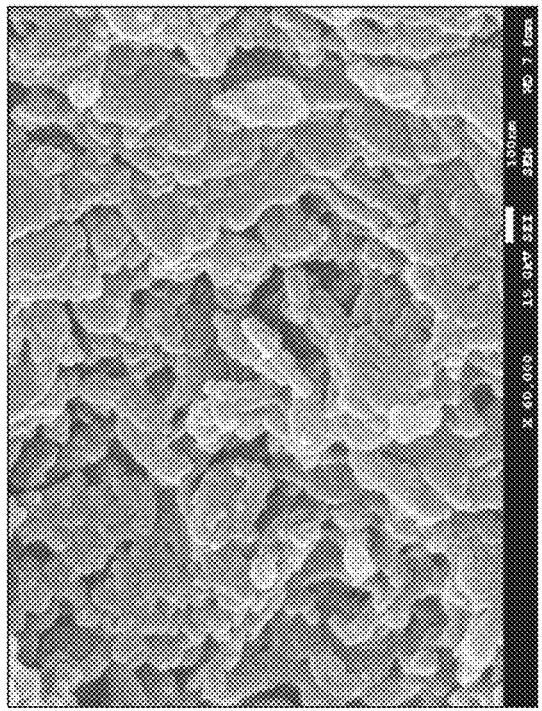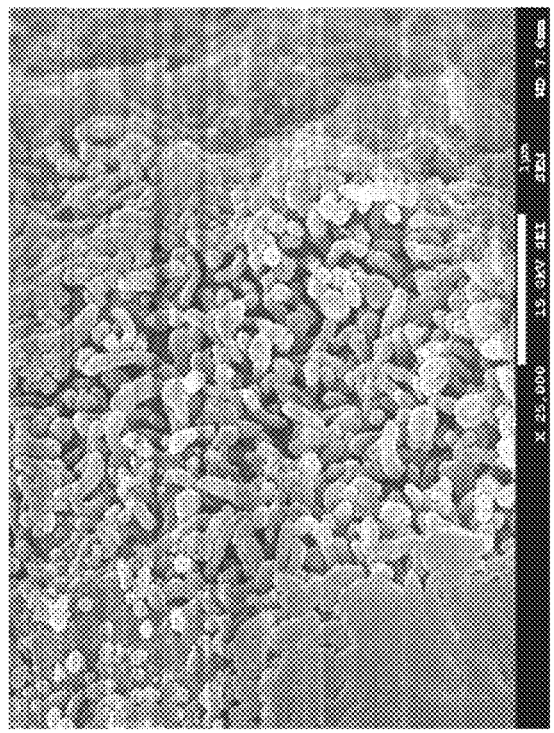
FIG. 20

METHOD OF FREEZE DRYING

CROSS-REFERENCE TO RELATED APPLICATIONS

This application is a continuation in part of International Application No. PCT/US 2016/059611, filed Oct. 29, 2016, and International Application No. PCT/US 17/30216, filed on Apr. 28, 2017, which claim the benefit of U.S. Provisional Application No. 62/248,162, filed on Oct. 29, 2015, and U.S. Provisional Application No. 62/248,194, filed on Oct. 29, 2015. The entire disclosures of each of the above applications are incorporated herein by reference.

BACKGROUND OF THE INVENTION

1. Field of the Invention

A method of drying, sterilizing, preserving, and impregnating material.

2. Description of the Prior Art

U.S. Pat. No. 6,670,402 B1 ('402 patent)

Freeze-drying is a time consuming processes which greatly affect its economic viability, especially for large batch sizes required for large scale production. The time required to perform freeze-drying is highly dependent on the size of the chamber used to perform the process and the size of the material to be dried. The '402 patent discusses typical supercritical drying (closely related to freeze-drying) processing times for a single batch of five 5"×9" flawless 1" thick aerogel panels in a 40 liter chamber as about 40 hours. The '402 patent then discloses a series of methods, employed in the current method of freeze-drying, to decrease the processing time when replacing the original liquid of the material with supercritical carbon dioxide. The methods include pre-pressurizing the chamber with gaseous carbon dioxide and continuously flowing supercritical carbon dioxide through the material to remove by diffusion the original liquid in the pores of the material.

WO2016/127084 A1 (WO'084)

Freeze drying is commonly used to create aerogels and WO'084 discloses a method of producing an aerogel by freeze-drying a gel containing micropores. The method includes replacing an original liquid of a gel material having pores with liquid carbon dioxide, freezing the carbon dioxide, and sublimating the carbon dioxide at ambient temperature and pressure to remove the carbon dioxide from the pores of the gel material thereby producing an aerogel.

The freeze-drying method disclosed in WO'084 can only be used on materials with certain properties such as gel material with high compressive modulus, and yield strength. An attempt to avoid gas-liquid interfaces is made by sub-cooling the gel material to temperatures substantially below the freezing point of carbon dioxide based on the theory that the freezing point of the liquid within the pores is dependent on the pore size. Using this method, the WO'084 also discloses carbon dioxide crystal sizes of less than about 5 nm.

SUMMARY OF THE INVENTION

The current method rapidly freezes the carbon dioxide by cooling the carbon dioxide at a rate of at least 0.2° C./min. Another aspect of the invention includes forming a solid layer on and surrounding the material from the liquid surrounding the material. After the solid layer has formed, the pressure about the material is decreased.

Advantages of the Invention

The current method allows highly delicate materials to be freeze-dried and for the large scale production of such freeze-dried materials to be done fast enough to be economically viable. Unlike WO'084, the ability to freeze-dry material according to the current method of freeze-drying is not dependent on the compressive modulus, compressive yield, or density of the material.

Rapidly freezing carbon dioxide according to the current method of freeze-drying minimizes or avoids damage due to gas-liquid interfaces and pore collapse. Without wishing to be bound by theory, it is believed that rapidly freezing the carbon dioxide leads to smaller carbon dioxide crystals. The smaller the size of the carbon dioxide crystals, the less damage is done to the pores while freezing. Rapidly freezing the carbon dioxide allows material containing pores of less than 2 nm in diameter to be dried without damage to the pores.

Freezing a solid layer on and around the material followed by depressurization protects the material from gas-liquid interfaces and surface tension while still allowing the material to be freeze-dried fast enough to be economically viable. Depressurization, as opposed to cooling by more conventional means, allows the freeze-drying processing times to be comparable to other economically viable freeze-drying processing times such as the method disclosed in the '402 patent.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of segments 6160, 6162 and units 1146, 1310, and 1310;

FIG. 8 is an illustration of a top-lid assembly 1150;

FIG. 12 is a partial perspective view of the sleeve assembly 1410;

FIG. 14 is an illustration of a cooling system 1166, and a heating system 1170;

FIG. 18 shows micrographs of an aerogel produced by the current method of freeze-drying;

FIG. 19 is a summary report showing Brunauer-Emmett-Teller (BET) results for an aerogel produced by the current method of freeze-drying;

FIG. 20 shows micrographs of dried placenta tissue produced by the current method of freeze-drying;

DESCRIPTION OF THE ENABLING EMBODIMENT

Figure 1:
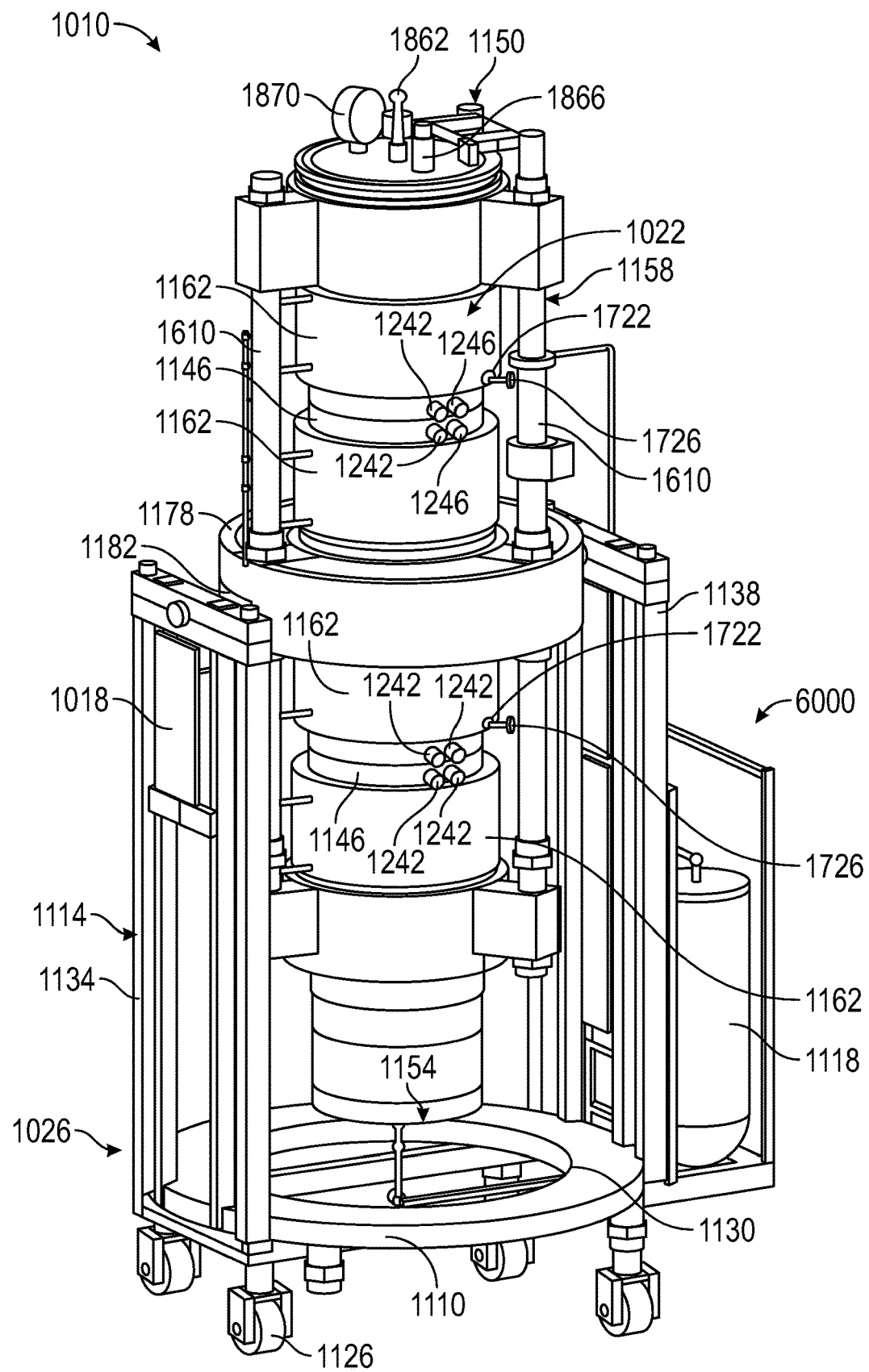
FIG. 1 is a perspective view of an extractor 1010 according to various embodiments.

The current method of freeze-drying removes liquid from a material containing pores while substantially preserving the material. The liquid may be surrounding the material or inside the pores of the material. The method of freeze-drying may also be used to sterilize and preserve material. The method of freeze-drying may also be used to impregnate the material.

The material may be any porous structure known in the art, such as a vehicle body, biological tissue, enzymes, nanoparticles, two dimensional and multi-layer materials containing defects, and nanofibers. The material may also be a mold having a predetermined shape that can be used for casting applications, such as lost foam casting. The material may also in a solvent. For example, enzymes may be manufactured in a liquid which must be removed to form a powder used for further processing or direct application.

Co-solvents may be used during the current method of freeze-drying. A co-solvent is any fluid which increases the solvation properties of carbon dioxide when mixed with carbon dioxide. The co-solvent must be miscible or soluble with carbon dioxide. Co-solvents are typically added in relatively small amounts. For example, a small amount of a co-solvent may increases the ability of carbon dioxide to dissolve polar compounds such as water. Typical co-solvents include methanol, ethanol, fluorinated solvents, alcohols, hydrocarbons, ethers, ketones, amines, and mixtures of the aforementioned.

The current method of freeze-drying may also be used to insert impregnating agents in to the pores of the material. Impregnating agents are any substance that is not present in the pores of the material prior to the current method of freeze-drying, are soluble in carbon dioxide and, if needed, one or more co-solvents, and is solid or liquid at the temperature and pressure condition at which carbon dioxide is sublimed in the current method.

Impregnating agents, solvents carrying impregnating agents and co-solvents are collectively referred to as carrying agents.

The current method of freeze-drying can be conceptualized as a series of sequential processes. The sequential processes comprise of Process I, Process II, Process III, and Process IV. Process I replaces the liquid surrounding the material with carbon dioxide. Process II replaces the liquid in the pores with carbon dioxide and, optionally, impregnating agents. Process III rapidly freezes the carbon dioxide both inside the pores and around the material. Process IV sublimes carbon dioxide from the material thereby producing a dried material which may contain impregnating agents.

The method may be performed in a chamber that has a drain at the bottom of the chamber and vents toward the top of the chamber.

Process I

In an optional step of Process I, an original liquid, defined as any liquid surrounding the material or in the pores of the material prior to the current method of freeze-drying, is exchanged with an intermediate liquid. The intermediate liquid is any liquid that has higher solubility with carbon dioxide than the original liquid or protects the material from unwanted chemical reactions. If the intermediate liquid has higher solubility with carbon dioxide than the original liquid, then exchanging the original liquid with the intermediate liquid may expedite the current method of freeze-drying. Examples of intermediate liquids include acetone, acetonitrile, acetic acid, amyl alcohol, benzene, carbon tetrachloride, cholrobenzene, cholroform, cyclo-cresylic acid, hexane, isopropyl alcohol, di-methyl formamide, ethanol, ethyl acetate, furfural, furfural alcohol, methanol, N-butane, N-heptane, N-hexane, pyridine.

The material is placed in a chamber. The material may be inside a container that can withstand cryogenic temperatures and may be surrounded by a fluid such as a carrier gas, particularly if the material is micron sized. The chamber may be filled with a saturated vapor to impede evaporation of the intermediate liquid from the material. The saturated vapor may be made from the intermediate liquid. The chamber may be heated to at least the critical temperature of carbon dioxide. The chamber may also be pressurized to just below the critical pressure by gaseous carbon dioxide. The chamber is pressurized at a rate that prevents turbulent fluid motion around the material.

The material is sealed inside the chamber. There must be a minimum distance between the material and the top of the chamber to act as a clearance space. The clearance space helps to ensures that the material is fully submerged in carbon dioxide and that the carbon dioxide level does not fall below the top of the material when liquid or supercritical carbon dioxide fills the chamber and is subsequently frozen.

In the next step of Process I, non-gaseous fluid carbon dioxide, and optionally a co-solvent, is pumped into the chamber. The non-gaseous fluid carbon dioxide may be either liquid or supercritical carbon dioxide. As used herein, non-gaseous includes both the liquid and supercritical phases, but does not include the gas phase. Non-gaseous fluid includes fluids that are a mixture of liquid and supercritical fluids. Once the material is fully submerged in non-gaseous fluid carbon dioxide, a drain at the bottom of the chamber is opened such that the intermediate liquid, the non-gaseous fluid carbon dioxide, and the co-solvent, if present, are discharged through the drain while the co-solvent and the non-gaseous fluid carbon dioxide are continuously pumped into the chamber. Continuously inserting fluid into the chamber while simultaneously draining fluid from the chamber is referred to as flushing. The rate of non-gaseous fluid carbon dioxide entering the chamber must be equal to or greater than the rate it is drained from the chamber to ensure that the chamber remains full at all times and that the material is fully submerged to avoid gas-liquid interfaces. Non-gaseous fluid carbon dioxide, and optionally a co-solvent, is pumped in the chamber until most of the intermediate liquid that had surrounded the material is drained.

The boundary between a gas and a liquid is known as the gas-liquid interface. The properties of the liquid at the gas-liquid interface can be different than the rest of the liquid, the bulk liquid, because the liquid molecules at the gas-liquid interface experience different intermolecular forces than the rest of the liquid. Molecules in the bulk liquid are surrounded by cohesive forces i.e. attractive forces between like molecules. Molecules at the gas-liquid interface also experience adhesive forces i.e. attractive forces between unlike molecules. The adhesive forces at a gas-liquid interface are between the liquid molecules and the gas molecules.

Surface tension results from the greater attraction of liquid molecules to each other (cohesion) than to the molecules in the gas (adhesion). The liquid molecules at the surface of the liquid bond more strongly to each other than to the liquid molecules in the bulk liquid. Surface tension refers to the stronger attraction between liquid molecules at a surface than between liquid molecules in the bulk liquid.

When a liquid evaporates from a porous material, the liquid recedes inside the pores causing the surfaces of the pore to be exposed to a gas-liquid interface. The receding liquid may pulls against the pore walls, causing the pore walls to pull inward and can result in permanent shrinkage, collapse, or rupturing of the pores as well as cracking of the material. The pulling of the pore walls by surface tensions is often referred to as capillary stress. When drying non-porous material, such as material suspended in a liquid, surface tension can cause the material to aggregate which may interfere with further processing or application of the material.

If the non-gaseous fluid carbon dioxide that is pumped into the chamber is supercritical, the supercritical carbon dioxide once inside the chamber will expand and cool to gaseous carbon dioxide. If the supercritical carbon dioxide continues to be pumped into the chamber, the temperature and pressure will increase past the critical point of carbon dioxide and all of the carbon dioxide in the chamber will be supercritical. The material is surrounded by the intermediate liquid which protects the material from gas-liquid interfaces and thermal shock when the supercritical carbon dioxide is pumped into the chamber.

The pressure may be maintained above the critical pressure of carbon dioxide for at least 10 minutes to sterilize the material.

If the non-gaseous fluid carbon dioxide that is pumped into the chamber is liquid carbon dioxide, then the liquid carbon dioxide is pumped into the chamber at a higher pressure than inside the chamber and between 80 and 1,000 psi. If the density of the liquid carbon dioxide is lower than the density of the intermediate liquid, then the intermediate liquid will flow out of the drain at the bottom of the chamber. If the intermediate liquid is miscible with carbon dioxide, then it may also be displaced to the top of the chamber and then discharged through the vents toward top of the chamber. If the density of the liquid carbon dioxide is greater than the intermediate liquid and the intermediate liquid is non-miscible, then the liquid carbon dioxide will force out the intermediate liquid though the drain disposed toward the bottom of the chamber.

The density of the carbon dioxide is controlled by regulating the temperature and pressure of the carbon dioxide. Liquid carbon dioxide may be cooled, and thus made denser, by flowing the liquid carbon dioxide over solid carbon dioxide disposed toward the top of the chamber. Controlling the density of the carbon dioxide allows the chamber to discharge the intermediate liquid quickly. The solid carbon dioxide inside the chamber also pressurizes the chamber due to sublimation of the solid carbon dioxide. The increase in pressure further increases the density of the liquid carbon dioxide.

Because carbon dioxide is heavier than air, it displaces any air that enters the chamber. If air is left in the chamber, the moisture in the air could rehydrate the material during the current method of freeze-drying. The air being displaced may be discharged through the vents disposed toward the top of the chamber.

When the material contains primary or secondary amines, such as polymers or biological tissue, the material is protected from the damaging effects of surface tension by the primary or secondary amines reversibly reacting with carbon dioxide to form carbamate groups. The carbamate groups act as capping agents. The carbamates include negatively charged carboxylate and hydroxyl groups. Both of the groups can have greater negative charge than the negative charge of the oxygen molecule in carbon dioxide. Repulsive forces between the negatively charged groups in the carbamate and the partially negative charged oxygen in the carbon dioxide molecules protect the amines from surface tension and maintain the reactivity of the amines in enzymes such as lysine.

Process II

Once most of the intermediate liquid surrounding the material has been discharged, Process II commences whereby the liquid inside the pores is replaced with non-gaseous fluid carbon dioxide and optionally impregnating agents.

In the first step of Process II, non-gaseous fluid carbon dioxide, and optionally one or more carrier agents, are pumped into the chamber. The carrier agents may be impregnating agents, solvents carrying impregnating agents and/or co-solvents. For example, to replace water in the pores with carbon dioxide, a hydrophobic co-solvent having a density of 1 $g/cm^3$ or less may be pumped into the chamber along with the carbon dioxide.

The mixture of non-gaseous fluid carbon dioxide, carrier agents, and the material may then be agitated to facilitate the extraction of the pore liquid. The mixture may be agitated with ultrasonic irradiation and/or mixed to establish shear forces while the non-gaseous fluid carbon dioxide, carrier agents, and the extracted liquid is drained through the bottom of the chamber.

The liquid in the pores is then extracted into the fluid surrounding the material by diffusion of the non-gaseous fluid carbon dioxide and the carrier agents in and out of the pores. The liquid in the chamber may be circulated to expedite extraction. Non-gaseous fluid carbon dioxide and carrier agents are pumped into the chamber as non-gaseous fluid carbon dioxide, carrier agents, and extracted liquid is discharged through either the drain disposed toward the bottom of the chamber or the vents disposed toward the top of the chamber.

Supercritical carbon dioxide is preferably used to extract the liquid from the pores due to its higher diffusivity (up to 10 times higher) than liquid carbon dioxide and viscosity that is about one tenth of liquid carbon dioxide. Consequently, extraction using supercritical carbon dioxide is much faster than extraction using liquid carbon dioxide. Also, the selectivity of supercritical carbon dioxide is adjustable and can be set to values ranging from gas-like to liquid-like.

The mixture of fluids surrounding the material comprising of supercritical carbon dioxide and carrier agents is denser with the extracted liquid than without. Therefore, the mixture quickly discharges through the drain disposed toward the bottom of the chamber.

Some materials may be damaged by contact with supercritical carbon dioxide or the temperature and pressure conditions necessary for supercritical carbon dioxide. Liquid carbon dioxide may be used if the material can be damaged by using supercritical carbon dioxide or if the process requires the lower diffusivity and solvation properties of liquid carbon dioxide. For example, elastomers may swell when in contact with supercritical carbon dioxide, so when the material is an elastomer, use of supercritical carbon dioxide should be avoided.

To use supercritical carbon dioxide to extract the liquid, supercritical, liquid, or gaseous carbon dioxide may be pumped into the chamber. If liquid or gaseous carbon dioxide is pumped into the chamber, then the temperature and pressure may be increased past the critical point of carbon dioxide to cause the carbon dioxide to become supercritical. When forcing the carbon dioxide to change to the supercritical phase, the temperatures and pressure conditions necessary to change phases can be varied by adding a secondary solvent to the carbon dioxide. Once the carbon dioxide has changed phase to supercritical carbon dioxide, supercritical carbon dioxide may be pumped into the chamber.

If liquid carbon dioxide is used for extraction, liquid carbon dioxide and carrier agents are pumped into the chamber while liquid carbon dioxide, carrier agents, and the extracted liquid is drained. The liquid carbon dioxide and the carrier agents are pumped into the chamber below the critical transition temperatures and pressures of the carrier agents.

After most of the liquid from the pores is extracted, the flushing of the carbon dioxide and the carrier agents is stopped and Process III commences.

The multiple embodiments of Process I and Process II, allow the current method of freeze-drying to be optimized to encompass original liquids that are miscible, immiscible, soluble and insoluble, denser, or less dense than, liquid carbon dioxide as well as a broad range of materials such as elastomers and materials containing polar or non-polar functional groups.

Process III

During Process III the chamber contents (the material, the non-gaseous fluid carbon dioxide and the optional carrier agents) are frozen to produce a matrix comprising of material encased in solid carbon dioxide and the co-solvent and the impregnating agent.

If the material contains primary or secondary amines and is dispersed in supercritical carbon dioxide, rapidly condensing the supercritical carbon dioxide to form fluid carbon dioxide by decreasing temperature avoids agglomeration issues that are typical in other drying processes such as rapid expansion of supercritical solutions (RESS) and Supercritical Antisolvent process (SAS) and has been shown to be an important factor that affects the material's ability to be successfully reconstituted.

The chamber contents are cooled at a cooling rate of at least $0.2°$ C./min to limit the size of crystals formed when carbon dioxide freezes and thereby prevent damage to the pores. If the material contains micropores, pores with average diameters of 2 nm or less, then a cooling rate of at least $0.5°$ C./min is preferred. The impregnating agent is precipitated into the pores as the non-gaseous fluid carbon dioxide freezes.

Without wishing to be bound by theory, freezing of carbon dioxide is generally believed to be a two-step process. The first step is nucleation, where the molecules aggregate into clusters, known as nuclei. The nuclei may be considered metastable, meaning the number of molecules present, the space between them in the nuclei, the nuclei's shape, and size of the nuclei are fluctuating. When enough molecules are present in the nuclei, often the nuclei at this point is referred to as the critical nuclei, the nuclei stabilizes and can become seeds for crystal growth. In the second step, herein referred to as crystal growth, each of the seeds grow to create periodic arrangements of molecules called crystals. Crystal growth proceeds as each crystal continues to add other carbon dioxide molecules surrounding them and incorporate them into their periodic arrangement. Carbon Dioxide crystals in periodic arrangements is crystalline carbon dioxide. Crystal growth can sometimes be accomplished by free carbon dioxide molecules being added to the crystal, while other times crystal growth results from two or more individual crystals merging together to form a larger crystal. Crystal growth continues until a preponderance of the available molecules are frozen. Freezing can also result in clusters of carbon dioxide molecules that are randomly oriented with respect to their surrounding molecules. When the arrangement of solid carbon dioxide molecules is predominantly random, without a common reoccurring pattern, the frozen carbon dioxide is considered amorphous. The frozen carbon dioxide molecules may consist of crystalline carbon dioxide, amorphous carbon dioxide, or a mixture of amorphous and crystalline carbon dioxide.

Without wishing to be bound by theory, it is believed that the size, distribution and morphology of the crystals is predominantly controlled by the cooling rate and nucleation rate. The faster the nucleation rate, the greater the number of nuclei and thus the smaller the crystals when carbon dioxide is frozen. Therefore, rapidly freezing the carbon dioxide leads to smaller crystals. The smaller the size of the carbon dioxide crystal, the less damage is done to the pores while freezing. Other factors believed to impact crystal size include the number of molecules available for crystal formation, the intermolecular spacing ability of the carbon dioxide molecules to coalesce with one another, the presence of non-carbon dioxide molecules, and the localized interactions of the carbon dioxide molecules with the materials.

Without wishing to be bound by theory, supercritical carbon dioxide has a greater dispersion of molecules than liquid carbon dioxide; therefore, rapidly freezing supercritical carbon dioxide will result in a greater dispersion of smaller carbon dioxide crystals compared to freezing of liquid carbon dioxide and therefore the least amount of damage to the pores.

The amount of carbon dioxide molecules available inside the chamber can be added while maintaining the supercritical fluid carbon dioxide. The number of supercritical carbon dioxide molecules present prior to freezing can help promote the formation of smaller crystal sizes during subsequent freezing steps.

When freezing supercritical carbon dioxide, the cooling rate may be used to selectively control the nucleation and growth rate of carbon dioxide crystals to rupture microbes residing in the pores of the material or the material surface thereby sterilizing the material. The formation of larger crystals, which could damage the pores, is avoided due to the high dispersion of supercritical carbon dioxide molecules prior to solidification.

If the material contains carbamates, the repulsive forces between the carbamate groups cause increased local anisotropy around the carbamates which effects the crystallization of carbon dioxide around the carbamates during freezing.

The chamber contents are cooled by heat transfer with a cryogenic fluid until a layer of solid carbon dioxide and carrier agents forms on and surrounding the material. Without wishing to be bound by theory, when carbon dioxide is frozen from a liquid or supercritical phase, the carbon dioxide will initially form a layer of solid carbon dioxide on the surface of the material. This layer of solid carbon dioxide protects the material from gas-liquid interfaces and surface tension. This is especially advantageous when the material has positively charged functional groups that would otherwise attract carbon dioxide molecules and cause damage due to the intermolecular attractions.

The chamber contents may be cooled by circulating a cryogenic fluid throughout the chamber using cooling coils and/or by exposing a wall of the chamber to a cryogenic fluid. The cryogenic fluid must have a freezing point below the freezing point of carbon dioxide. Examples of suitable cryogenic fluids include liquid nitrogen and liquid helium. The material cannot be immersed into a cryogenic fluid because the resulting surface tension could damage the material.

After a solid layer of carbon dioxide and carrier agents has formed on and surrounding the material, the chamber is depressurized at a rate if at least 0.001 Mpa/min and less than or equal to 2.0 Mpa/min. Depressurization may occur by opening vents to decrease pressure within the chamber allowing the carbon dioxide to change phase to gaseous carbon dioxide and then escape through the vents. Depressurizing the chamber further cools the chamber. Depressurization must be after a layer primarily of solid carbon dioxide has formed on the material, however, the current method does not require that depressurization occur immediately following the formation of the layer of solid carbon dioxide on the material. Other steps may be performed in between depressurization and the formation of the layer of solid carbon dioxide.

To sterilize the material, the pressure may be increased to above the critical pressure of carbon dioxide and the pressure maintained at above the critical pressure of carbon dioxide for at least 10 minutes before rapidly depressurizing the chamber. Pressurizing the chamber, maintaining the pressure for at least 10 minutes, and then rapidly depressurizing may be repeated in order to sterilize the material.

Process IV

During process IV the carbon dioxide is sublimed from the matrix to produce a dried and sterilized material that contains the impregnating agent in its pores. The carbon dioxide is sublimed by changing the environment of the matrix to a temperature between room temperature and about 400° C. and a pressure above atmospheric pressure.

Figure 17:
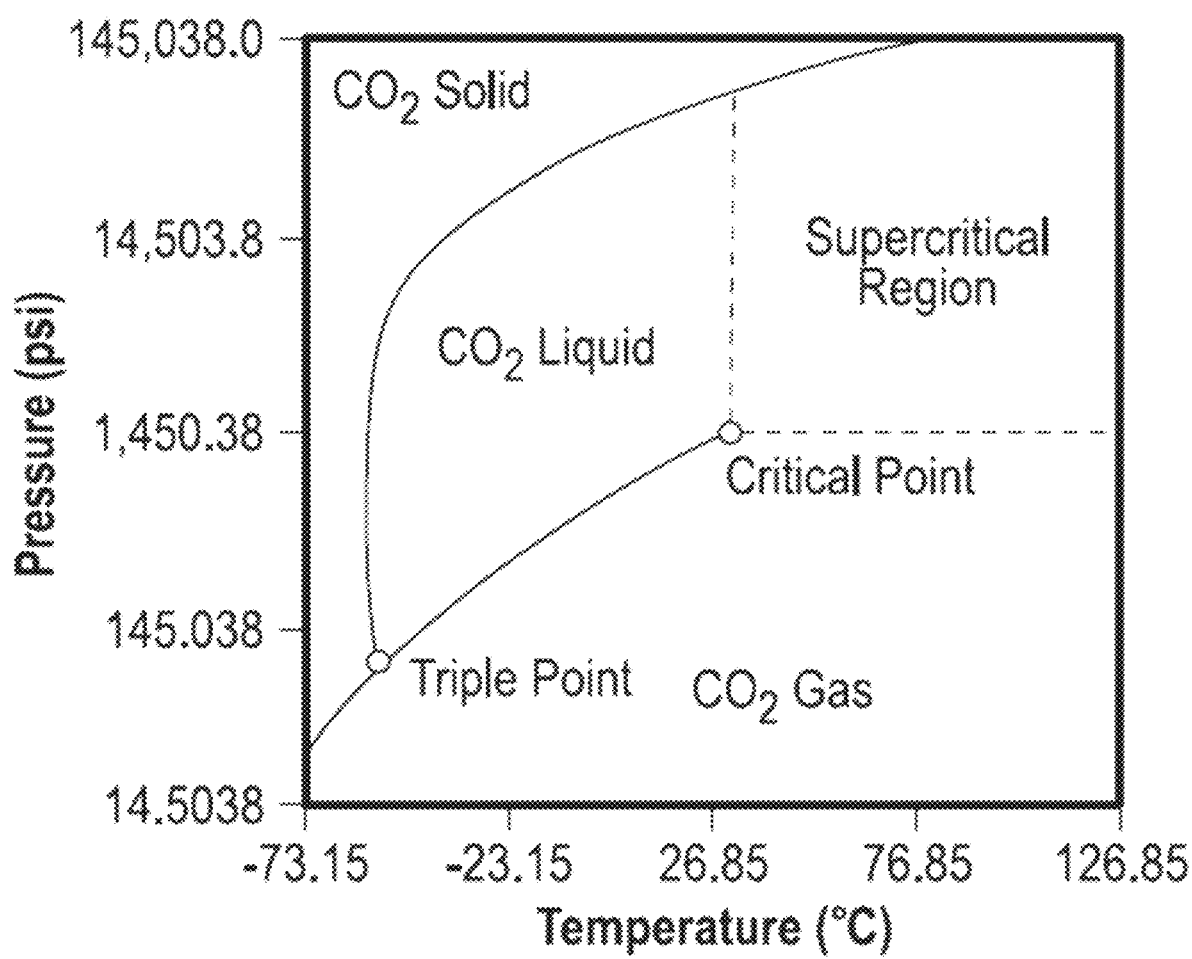
FIG. 17 is a phase diagram for carbon dioxide.

To sublime carbon dioxide, the environment must have relatively little humidity and may be at any temperature and pressure combination in which carbon dioxide is in the gaseous phase. As can be seen by the phase diagram of FIG. 17, the temperature and pressure at which carbon dioxide is gaseous encompass a broad range of pressures and temperatures. Suitable temperature and pressure conditions for carbon dioxide to sublime in include 1 atm and above −78.5° C. as well as 5.11 atm and above 56.6° C. Subliming at pressures below atmospheric pressure can cause carbon dioxide crystals to fuse which in turn can damage the material.

When the material contains carbamates, sublimation should be done at temperatures between approximately 28° C. and 400° C. Carbamates reform amines between approximately 28° C. and 400° C. At temperatures above about 400° C., carbamates degrade. Preferably the temperature is kept below 80° C. to avoid the carbamates undergoing chemical reactions other than the chemical reaction of reforming amines.

Due to the large range of temperatures and pressures at which carbon dioxide sublimes, a carefully controlled environment is not required for the sublimation process. Carbon dioxide may be sublimed by removing the material from the chamber and allowing the carbon dioxide to sublime at room temperature and atmospheric pressure. Carbon dioxide may also be sublimed by exposing the chamber to the environment and allowing the pressure to equilibrate, such as by opening vents and/or drains of the chamber.

EXAMPLES

Embodiments of the present technology are further illustrated through the following non-limiting examples.

Example 1

A polyamide aerogel was synthesized using a solution of m-phenylenediamine (mPDA) (6.832 g, 63.20 mmol) in N-methylpyrrolidinone (NMP) (179.96 mL), which was cooled to 5° C. using an ice water bath. Terephthaloyl chloride (TPC) (12.44 g, 61.14 mmol) was added in one portion as a solid and the cooled solution was allowed to stir for 25 minutes. 1, 3, 5-benzenetricarbonyl trichloride (BTC) was added and the mixture was vigorously stirred for 5 minutes before being poured into four 20 mL cylindrical molds lined with Teflon and five small rectangular silicone molds. Gelation occurred within 5 minutes. After aging overnight at room temperature, the monolith samples were removed from the molds and placed in 500 mL jars of acetone. This was followed by seven solvent exchanges as 24 hour intervals to ensure that all of the NMP was removed from the gels. Upon successful solvent exchange, the samples were placed in a container of acetone and then into a chamber. Once closed inside the chamber, the chamber was partially filled with acetone using the solvent inlet line 62 to ensure that the samples were safely submerged in the acetone. Thereafter liquid carbon dioxide was added to the chamber and draining and filling of the chamber was performed as described above to flush the acetone from the container and samples therein. An inside the chamber was also filled with dry ice as described above. The draining and filling was performed at a proportional rate such that the chamber was substantially filled throughout the filling and draining process, and was continued for 5-10 minutes at a time followed by rest periods of 1-12 hours over the course of 72 hours. Importantly, during the process the samples were continuously submerged in a solvent in the container, i.e., were not exposed to a gas-liquid interface. After the acetone from the containers had been replaced with liquid carbon dioxide, liquid nitrogen was circulated about the monolith samples as described above to rapidly freeze the samples and the liquid carbon dioxide. After a sufficient amount of time has passed to allow for freezing of the liquid carbon dioxide in the containers, the containers were quickly removed so that the solid carbon dioxide does not transition to liquid. The vents may be used to ensure that the pressure inside the chamber remains below a point that allows for solid carbon dioxide to revert back to a liquid. For example, the pressure may be depressurized to approximately 1 atm before opening the chamber. The samples thereafter were dried at a temperature above −80° C. in a fume hood operating under low humidity conditions (0-30% humidity). Although optional, in this example, heat was added by placing the samples in an oven at or above 160° C. to accelerate sublimation.

FIGS. 18A and 18B show scanning electron microscopy (SEM) images of the polyamide aerogel of Example 1.

These SEM images show retention structures in the nanometer range, which is far smaller than the known minimum crystal size of carbon dioxide crystals (which is about 1 micron or roughly ten times the scale bar shown in the photos).

FIG. 19 shows Brunauer-Emmett-Teller (BET) results for the polyamide aerogel of Example 1.

The BET results indicate the presence of microporous structures that are approximately 2 nm or smaller, indicating that the process described above dries the samples without damaging the structure of the samples.

Example 2

Placenta tissue samples underwent solvent exchange with ethanol. A container with the placenta tissue in ethanol was placed in the chamber. Liquid carbon dioxide was introduced into the vessel and flooding and draining was carried out as described in Example 1 to displace the ethanol. Once most or all of the ethanol was removed from the samples, the samples were rapidly frozen as set forth above. The samples were thereafter removed from the chamber and dried at ambient temperature and pressure overnight in a low humidity environment.

FIGS. 20A-20D show SEM images of the placenta tissue samples of Example 2.

The SEM images show that the placenta tissue nanoporous structure is preserved and is smaller than 1 micron, indicating that the process described above provides a method for drying samples in a way that does not damage the porous structure, including the microporous structure.

Description of the Extractor 1010

An extractor may be used to perform the current method of freeze-drying. As shown in FIG. 1, the extractor 1010 comprises a vessel 1022, a recycle system 6000, a support frame 1158, and a first cart 1026.

Vessel 2030

As best shown in FIG. 2(a), the vessel 1022 comprises one or more male segments 6160 and one or more female segments 6162 collectively known as segments 6160, 6162. The segments 6160, 6162 are cylindrical in shape and are disposed about an axis A. The segments 6160, 6162 also include a first interior surface 6010. The male segment 6160 extends from a first end 6036 to a second end 6038. A welding band 1222 is adjacent the first end 6036. A pair of ports 1242 extends through the welding band 1222 to allow fluid communication through them.

Figure 3:
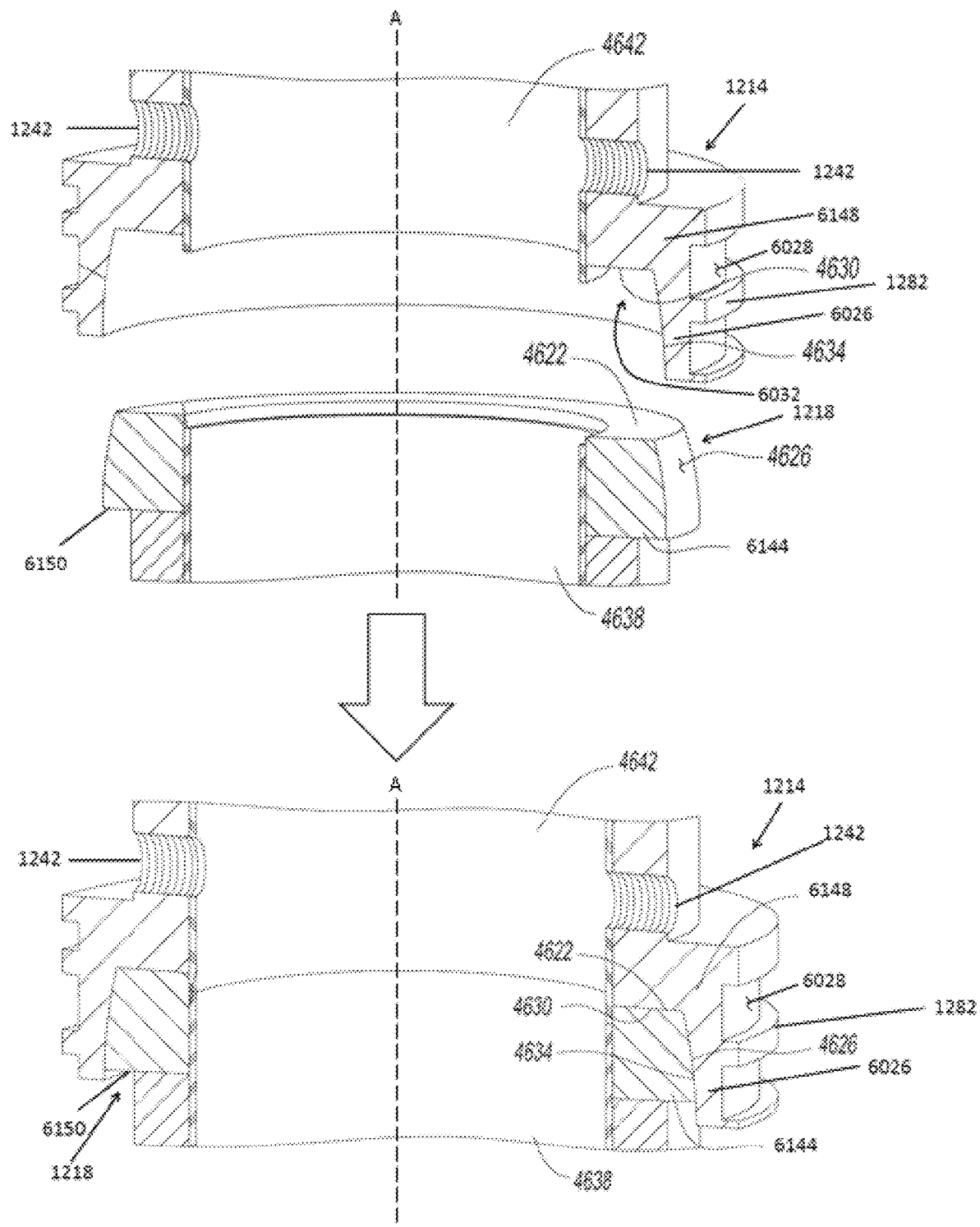
FIG. 3 is a sectional view of male and female subs 1218, 1214.

A male sub 1218 is adjacent the second end 6038. As best shown in FIG. 3, the male sub 1218 comprises a first protrusion 6144 of annular shape. The first protrusion 6144 extends between a ledge 6150 and a male face 4622 which are both flat and perpendicular to axis A. The first protrusion 6144 has a first outer surface 4626 that is convex.

As best shown in FIG. 2(a), the female segments 6162 are highly similar to the male segments 6160 except for a female sub 1214 replacing the male sub 1218. The female segment 6162 extends from a third end 6164 to a fourth end 6166. A welding band 1222 is adjacent the third end 6164. A pair of ports 1242 extends through the welding band 1222.

As best shown in FIG. 3, the female sub 1214 has an L shaped cross section containing a short leg 6148 a long leg 6026. The short leg 6148 extends perpendicular to the female segment 6162. The long leg 6026 extends axially away from the female segment 6162. The long leg 6026 has a second outer surface 6028 and a second inner surface 4634. The second outer surface 6028 is threaded. The second inner surface 4634 is concave and configured to mate with the first outer surface 4626 of the male sub 1218. A female face 4630 is formed by the short leg 6148. The female face 4630 is flat and adjacent the long leg 6026. The long leg 6026 and the female face 4630 define a notch 6032.

As shown in FIG. 3, the male sub 1218 sealingly engages with the female sub 1214 by entering the notch 6032 such that the first outer surface 4626 of the male sub 1218 mates with the second inner surface of the female sub 1214. The male and female subs 1218, 1214 may also sealingly engage by the male face 4622 mating with the female face 4630 as shown by FIG. 3.

As shown in FIG. 2, a unit 1146, 1310, 1314 is formed by fixedly coupling (e.g. welding) two segments 6160, 6162 together at their fourth end 6166 or their third end 6164 such that the segments 6160, 6162 are coaxial and the ports 1242 are aligned. A unit 1146, 1310, 1314 with two male subs 1218 is a male unit 1310. A unit 1146, 1310, 1314 with two female subs 1214 is a female unit 1314. A unit 1146, 1310, 1314 with both a male sub 1218 and a female sub 1214 is an androgynous unit 1146.

The segments 6160, 6162 may also include liners 4638, 4642 of stainless steel that line the first interior surface 6010. A liner 4638, 4642 that lines a male segment 6160 is referred to as a male liner 4638. A liner that lines a female segment 6162 is referred to as a female liner 4642.

As shown in FIG. 3, the female liner 4642 extends past the short leg 6148. The male liner 4638 is recessed from the male face 4622. When the male and female subs 1218, 1214 are adjacent and coaxial, the male and female liners 4638, 4642 abut and form a continuous barrier of stainless steel which facilitates maintaining a sterile environment within the units 1146, 1310, 1314. The liners 4638, 4642 also facilitate formation of hammer unions 3022 by aligning the segments 6160, 6162 coaxially once the female liner 4642 is inserted into the male segment 6160. Once the segments 6160, 6162 are aligned, a nut 1226 may easily be attached in order to form a hammer union 3022.

Figure 4:
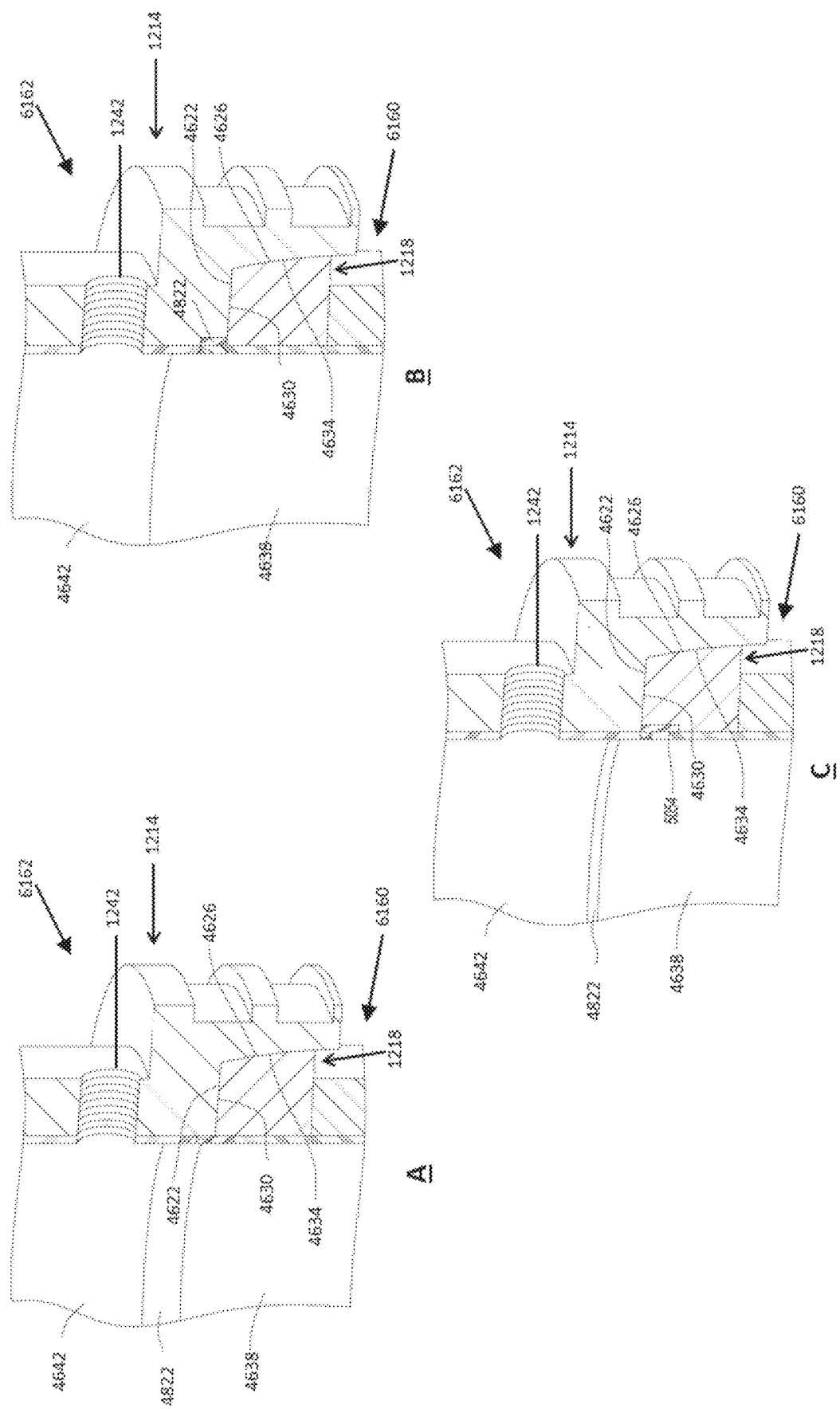
FIG. 4 is a sectional view of various embodiments of a gasket 4822.

In an alternative embodiment shown in FIG. 4A, the female liner 4642 may be recessed from the female face 4630, the male liner 4638 may be recessed from the male face 4622 and a gasket 4822 of annular shape and elastomeric material may be disposed between the male and female liners 4638, 4642 to create a seal when the gasket 4822 is compressed by the liners 4638, 4642.

In an alternative embodiment shown in FIG. 4B, the gasket 4822 may be housed in a groove 5054 in the short leg 6148 of the female sub 1214. The groove 5054 is adjacent the female liner 4642 and the female face 4630. In this embodiment, the male and female liners 4638, 4642 abut and a seal is formed by the compression of the gasket 4822 in the groove 5054.

In an alternative embodiment shown in FIG. 4C, the gasket 4822 may have an "L" shape such that it can both be in the groove 5054 and be between the male and female liners 4638, 4642.

Figure 5:
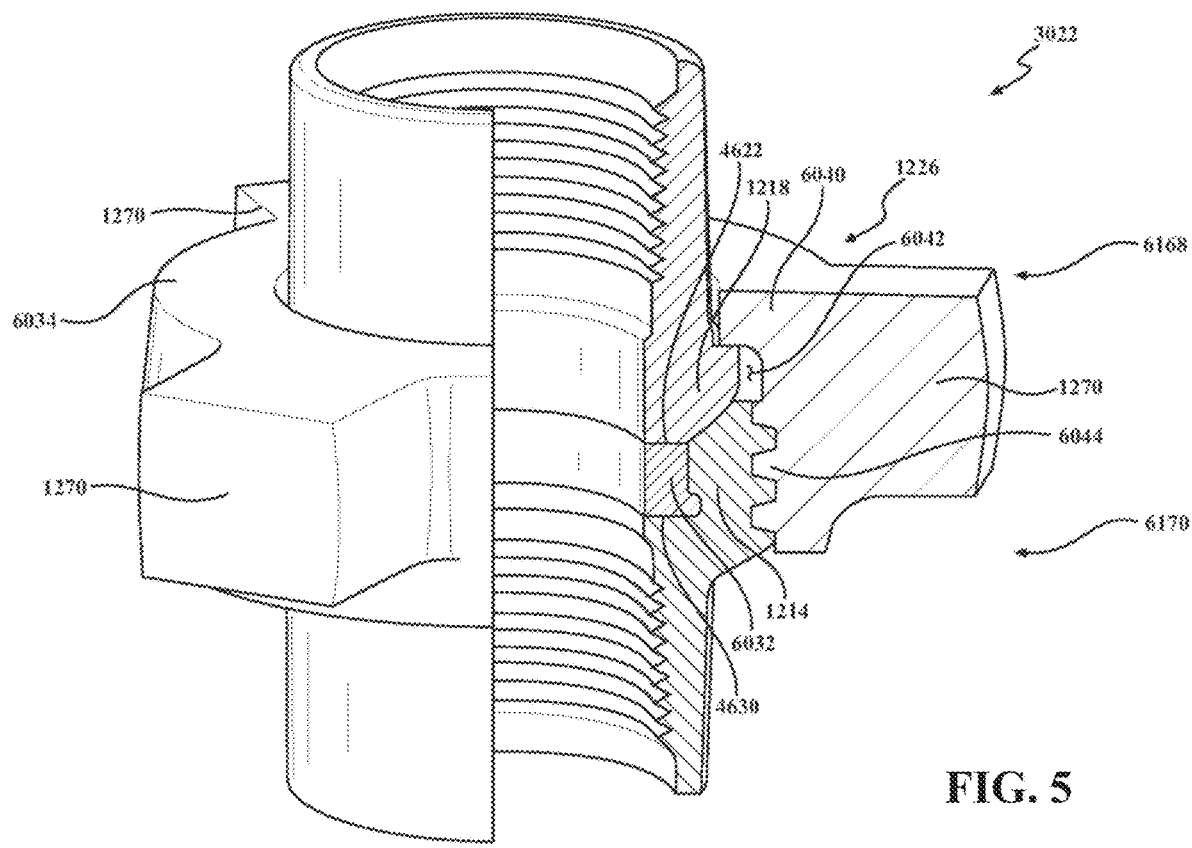
FIG. 5 is a sectional view of a hammer union 3022.
Figure 6:
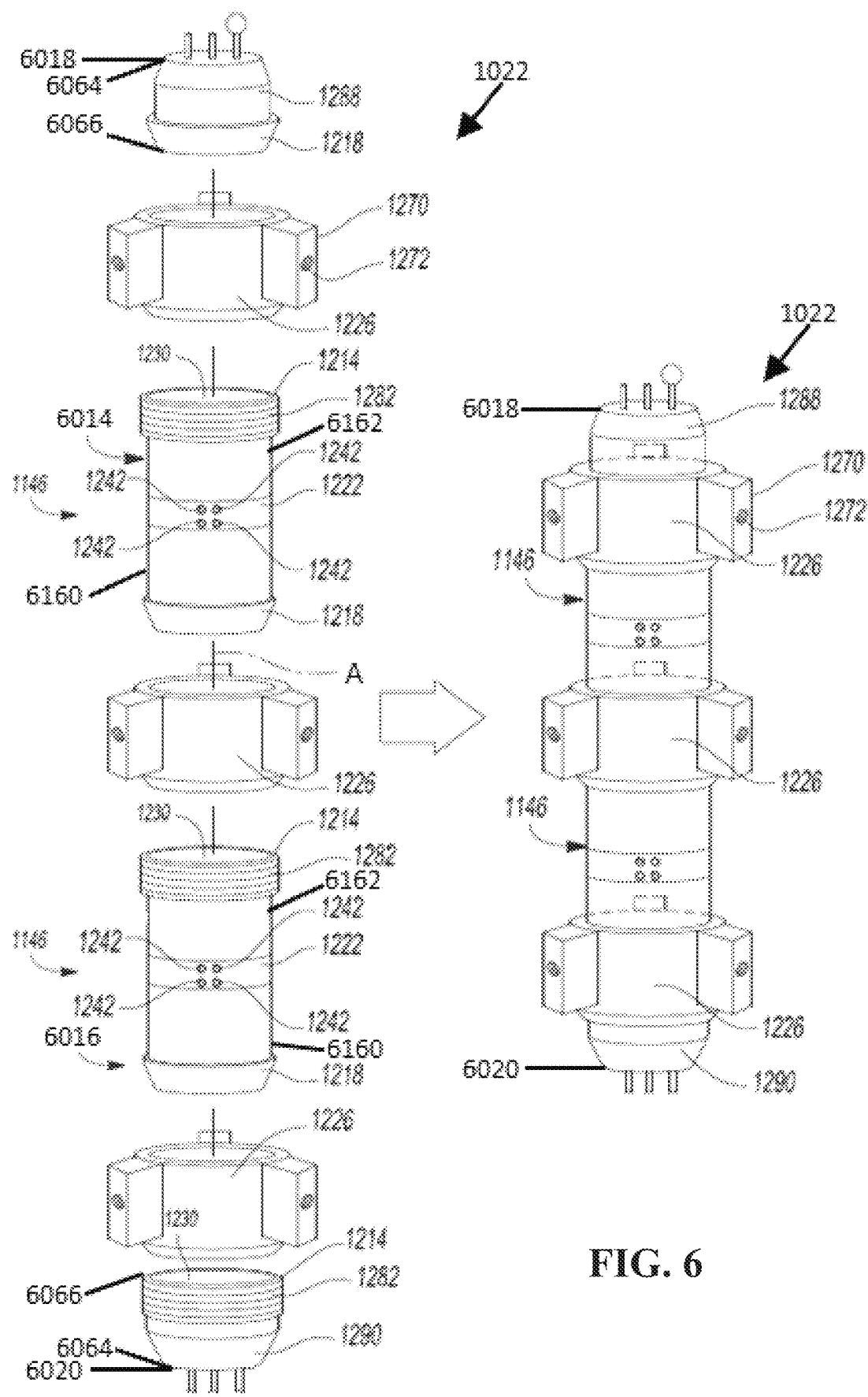
FIG. 6 is an illustration showing exploded and assembled views of a vessel 1022.

As best shown in FIGS. 5 and 6, a nut 1226 has a fifth end 6168 and a sixth end 6170. Adjacent the fifth end 6168 is a jut 6040 of rectangular shape that extends radially inward. The nut 1226 has a third interior surface 6042. The third interior surface 6042 has second threading 6044 which extends from the jut 6040 to the second end 6038. The nut 1226 has three second protrusions 1270 that extend radially outward and are equidistantly spaced around the cylindrical body 6034. The second protrusions 1270 permit a user to easily rotate the nut 1226. In an alternative configuration (not shown) the second protrusions 1270 can be replaced with surfaces configured to be gripped by a tool (not shown), such as the flat surfaces of a traditional hex-nut.

As shown in FIG. 6, each second protrusion 1270 has a bore 1272 which extends radially inward. The bore 1272 is threaded which permits first rods 1182 (not shown) with mating threads to be threaded into the bores 1272 in order to provide additional leverage when turning the nut 1226. Furthermore, hot fluid can be pumped into the bores 1272 to heat the nut 1226 to a different temperature than the rest of the unit 1146, 1310, 1314. This can reverse contraction of the nut 1226 caused by extremely low temperatures and thereby permit rotation of the nut 1226 without needing to heat the entire vessel 1022. Furthermore, the bores 1272 can be used to threadibly attach inserts (not shown) such as threaded lunette rings (not shown) or hooks (not shown), which assist in lifting and positioning the nut 1226. Bores 1272, vertically spaced from one another, may also be connected by piping (not shown) which allow an operator to simultaneously and easily rotate more than one nut 1226. Each protrusion has a first conduit (not shown) which extends axially through the second protrusions 1270. The first conduit (not shown) is threaded and facilitates attachment of the vessel 1022 to the support frame 1158.

As best shown in FIG. 5, a hammer union 3022 is formed when a male sub 1218 and a female sub 1214 are mated by the compression of a nut 1226 around them.

The segments 6160, 6162 may also include liners 4638, 4642 of stainless steel that line the first interior surface 6010. A liner that lines a male segment 6160 is referred to as a male liner 4638. A liner that lines a female segment 6162 is referred to as a female liner 4642. As shown in FIG. 6, the units 1146, 1310, 1314 can be coupled together via hammer unions 3022 in any suitable combination to produce a vessel 1022 of a desired length. The vessel 1022 defines a chamber 1230. The chamber 1230 is capable of holding pressurized fluid and is extendable to fit the needs of the operator.

The vessel 1022 has a top 6018 and a bottom 6020. The plurality of segments 6160, 6162 includes a first segment and a last segment. The first segment is the segment closest to the top 6018 of the vessel 1022. The last segment is the segment closest to the bottom 6020 of the vessel 1022.

Adjacent both the top 6018 and the bottom 6020 are lids 1288, 1290 which seal off the chamber 1230 from the surroundings at the top 6018 and bottom 6020. Each lid is of a cylindrical shape and has a seventh end 6064 and an eighth end 6066. The lids 1288, 1290 are closed at the seventh end 6064. A top lid 1288, adjacent the top 6018, has a pressure gauge 1870, a first inlet 1862, and a pressure relief vent 1866 adjacent the seventh end 6064. A bottom lid 1290, adjacent the bottom 6020, has a plurality of first valves which may be used to add or release fluid from the chamber 1230. At the eighth end 6066 is either a male sub 1218 or a female sub 1214 such that the subs 1214, 1218 can couple to units 1146, 1310, 1314 via hammer unions 3022.

Support Frame 1158

Figure 7:
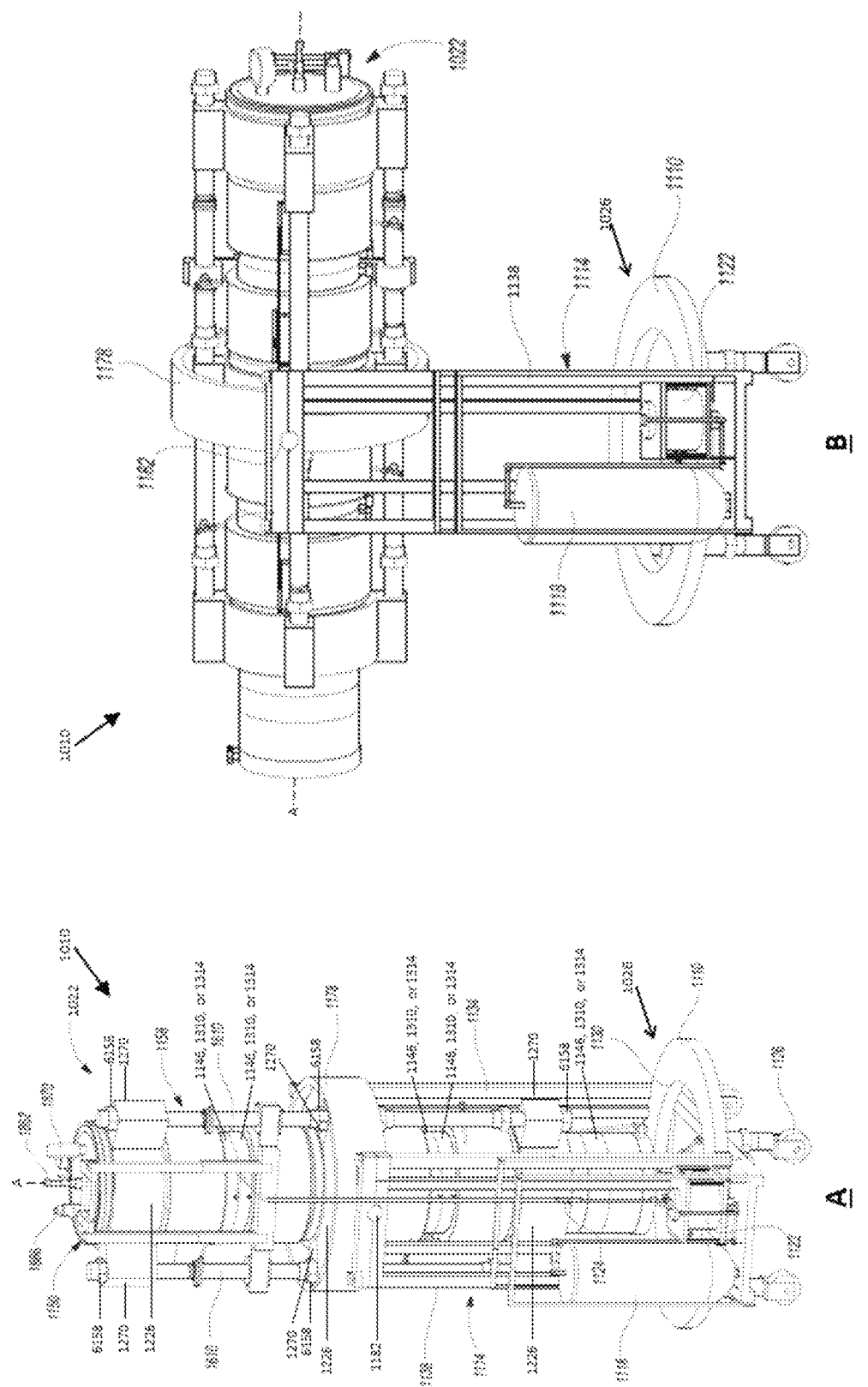
FIG. 7 is an illustration of the extractor 1010 according to various embodiments with the vessel 1022 in vertical and horizontal positions.

As best shown in FIG. 7, the support frame 1158 supports the vessel 1022 above the ground and allows it to rotate. The support frame 1158 comprises a first ring 1178 fixedly coupled to a nut 1226 via its second protrusions 1270 such that the nut 1226 is coaxial to the first ring 1178. The nut 1226 is preferably threadibly attached to a unit 1146, 1310, 1314 that is centrally located in the vessel 1022. Two rods 1182 extend radially outward from the first ring 1178 and are diametrically opposite. The rods 1182 extend through and are rotatably attached to the first cart 1026. The rods 1182, first ring 1178, and first cart 1026 allow the vessel 1022 to rotate between a vertical position, where axis A is perpendicular to the ground, and a horizontal position, where axis A is parallel to the ground. The vertical position is shown in FIG. 7A. The horizontal position is shown in FIG. 7B. Alternatively, the rods 1182 may be fixedly attached to the first cart 1026 and rotatably attached to the ring. Rotating the vessel 1022 to the horizontal position assists in loading and unloading the chamber 1230. Rotating the vessel 1022 to the vertical position facilitates operation of the extractor 1010, such as when freeze-drying.

The support frame 1158 also comprises three second rods 1610 which are parallel to axis A and extend through the vertically aligned first conduits (not shown) of the second protrusions 1270. The rods 1182 have fifth threading (not shown) which corresponds with the fourth threading (not shown) of the first conduits (not shown) in the second protrusions 1270. Second nuts 6158 abut the first conduits (not shown) above and below and threadibly mate with the second rods 1610. The second rods 1610 are prevented from axial movement by the mating of the second protrusions 1270 and the second nuts 6158 via threading.

Lid Assemblies 1150, 1154

In alternative embodiments, the lids 1288, 1290 may be replaced with a top-lid assembly 1150 and a bottom-lid assembly 1154. With reference to FIG. 8, a top-lid assembly 1150 comprises a first plug 1850 and a scaffold 1854. The first plug 1850 is a solid cylinder that extends along axis A. The first plug 1850 is configured to fit within the first segment. The first plug 1850 may be threaded, as shown in FIG. 8(A), in order to threadibly engage the uppermost nut 1226. Alternatively, the first plug 1850 may be smooth in order to slide into the first segment. The first plug 1850 is configured to seal the top 6018 of the chamber 1230 and to be easily removable in order to access the chamber 1230 and insert or remove materials. The first plug 1850 has three orifices 6068 which correspond to a pressure gauge 1870, a first inlet 1862, and a pressure relief vent 1866 (shown in FIG. 7) similar to the lids 1288, 1290. The pressure relief vent 1866 may be used to release pressure from the chamber 1230.

The top-lid assembly 1150 also comprises a scaffold 1854. The scaffold 1854 comprises a frame 1874 of square shape that is welded to the first plug 1850 and extends perpendicular to axis A, past the plug. The frame 1874 has a first side 6070 and a second side 6072 which are parallel and a third side 6074 and a fourth side 6076 which are parallel. The first, second, third, and fourth sides 6070, 6072, 6074, 6076 define the square shape of the frame 1874. The frame 1874 is welded to the first plug 1850 at the first side 6070. Two posts 1878 are welded to the frame 1874 at the third and fourth sides 6074, 6076, adjacent the second side 6072. The posts 1878 extend perpendicular to the frame 1874 along the vessel 1022 to a lower bracket 1886. The lower bracket 1886 and the two posts 1878 are fixedly coupled together. An upper bracket 1882 is disposed above the lower bracket 1886 and is also fixedly coupled to the posts 1878. Each bracket has two first apertures 1890 disposed on opposite ends of the bracket. The first apertures 1890 of the lower and upper bracket 1886, 1882 are vertically aligned so that second rods 1610 can extend through the first apertures 1890.

Second rings 1858 are Disposed below and aligned with each first aperture 1890. The second rings 1858 can have internal threads (not shown) that can threadably engage external threads (not shown) on the second rods 1610. The second rings 1858 support the brackets 1882, 1886 on the second rod 1610. When the second rings 1858 are rotated, they can drive the brackets 1882, 1886 up or down to allow access to the chamber 1230 or to seal the chamber 1230 with the first plug 1850. The second rings 1858 can be easily rotated manually by an operator, such as by hand or using a tool (not shown), or can be configured to be rotated by motors 1846 for automatic opening 6078 and closing of the top-lid assembly 1150.

Figure 9:
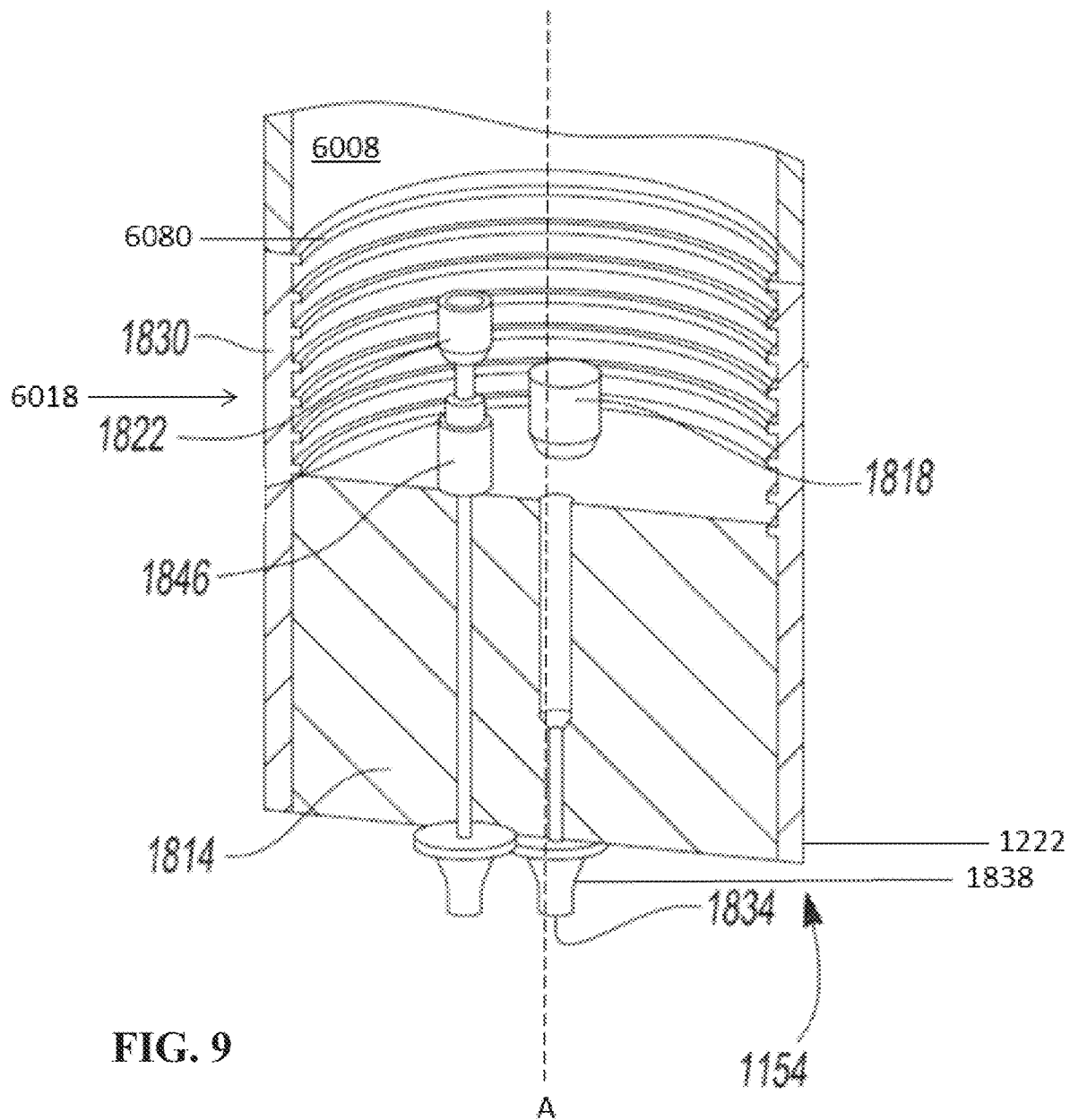
FIG. 9 is a sectional view of a bottom-lid assembly 1154.

The bottom-lid assembly 1154 is adjacent the bottom 6020. As best shown in FIG. 9, the bottom-lid assembly 1154 comprises a second plug 1814 within a segment. The second plug 1814 is a solid cylinder that extends along axis A within last segment. The second plug 1814 is adjacent the welding band 1222 to seal the bottom 6020 of the chamber 1230 at the bottom 6020. The second plug 1814 has sixth threading 6080. The sixth threading 6080 negatively corresponds to the first threading 1282 of the segment such that the second plug 1814 can be screwed into the segment. The segment in the bottom-lid assembly 1154 has either a male or female sub 1218, 1214 so that it can mate with the corresponding male or female sub 1218, 1214 of a unit 1146, 1310, 1314. In FIG. 9 the bottom-lid assembly 1154 has a female sub 1214 which mates to the male sub 1218 of the unit 1146, 1310, 1314.

A second conduit 1834 extends vertically through the second plug 1814. The second conduit 1834 has a bottom-valve 1838 disposed below the second plug 1814 for releasing fluid from the chamber 1230. The bottom-valve 1838 can be operable in a closed mode, a first open mode, and a second open mode. In the closed mode, the bottom-valve 1838 prevents fluid from exiting the chamber 1230 through second conduit 1834. In the first open mode, the bottom-valve 1838 permits fluid communication from the first bore 6008 to a compressor 1122. In the second open mode, the bottom-valve 1838 permits fluid communication to the atmosphere, or to a recovery device.

The bottom-lid assembly 1154 also includes an ultrasonic transducer 1818 that is embedded in the second plug 1814 and extends into the chamber 1230. The ultrasonic transducer 1818 can be configured to detect conditions within the chamber 1230.

The bottom-lid assembly 1154 also includes a mixing device 1822. The mixing device 1822 includes a motor 1846 coupled to a stirring member (not shown). Both the motor 1846 and the stirring member (not shown) are disposed in the chamber 1230.

Traditional electric motors 1846 contain a rotary shaft, bearings, and a shaft seal. The bearings serve to reduce friction and eliminate unwanted movement as the rotary shaft rotates. They typically require a lubricant and the typical lubricants used are oils. Shaft seals are used to retain the lubricant in the bearings and to prevent dust from entering the bearing.

Traditionally motors 1846 used to stir vessels 1022 are located outside of the vessel 1022 and are attached to a drive shaft which extends into the vessel 1022. Additionally, a mechanical seal is necessary to seal the drive shaft as it enters the vessel 1022. Placing the motor 1846 inside the vessel 1022 eliminates the need for shaft seals and a mechanical seal. Without such seals, the maximum stirring rpm and the maximum pressure in the chamber 1230 increases. Furthermore, the drive shafts may be shortened which reduces the power requirements of the motor 1846. The motor 1846 may be powered electrically or pneumatically. This configuration also reduces cost by both eliminating the need for expensive shaft seals and mechanical seals, and by extending the lifespan of the motor 1846.

Oil lubricants cannot be used inside the vessel 1022 because supercritical carbon dioxide, used during freeze-drying, will dissolve the oil. However, supercritical carbon dioxide will lubricate the bearings. Bearing types suitable for use in the motor 1846 include non-lubricated bearings, self-lubricating bearings, and gas lubricated bearings. Motor 1846 housing is not necessary.

The motor 1846 may also be encased in a filter not shown (not shown) that prevents solutes and/or particles from entering the motor 1846 and possibly damaging it. The filter not shown (not shown) would allow carbon dioxide to pass through so that it may lubricate the bearings. The filter not shown may be porous or non-porous. The motor 1846 parts are also cooled by direct contact with supercritical carbon dioxide during operation.

The motor 1846 may be an AC motor 1846. AC motors 1846 include a rotor and a stator. Both the rotor and the stator include windings. The windings may be coated to stop a wide variety of chemicals from damaging the windings. The windings may be coated using any of the conventional coating methods including potting, encapsulation, and lamination.

Alternatively, a magnetic stirrer (not shown) within the chamber 1230 may be coupled to a second motor 6140 (not shown) outside of the chamber 1230.

Two electrical cords 6082 extend from the second plug 1814 for supplying power to the ultrasonic transducer 1818 and the mixing device 1822.

Sleeve Assembly 1410

Figure 11:
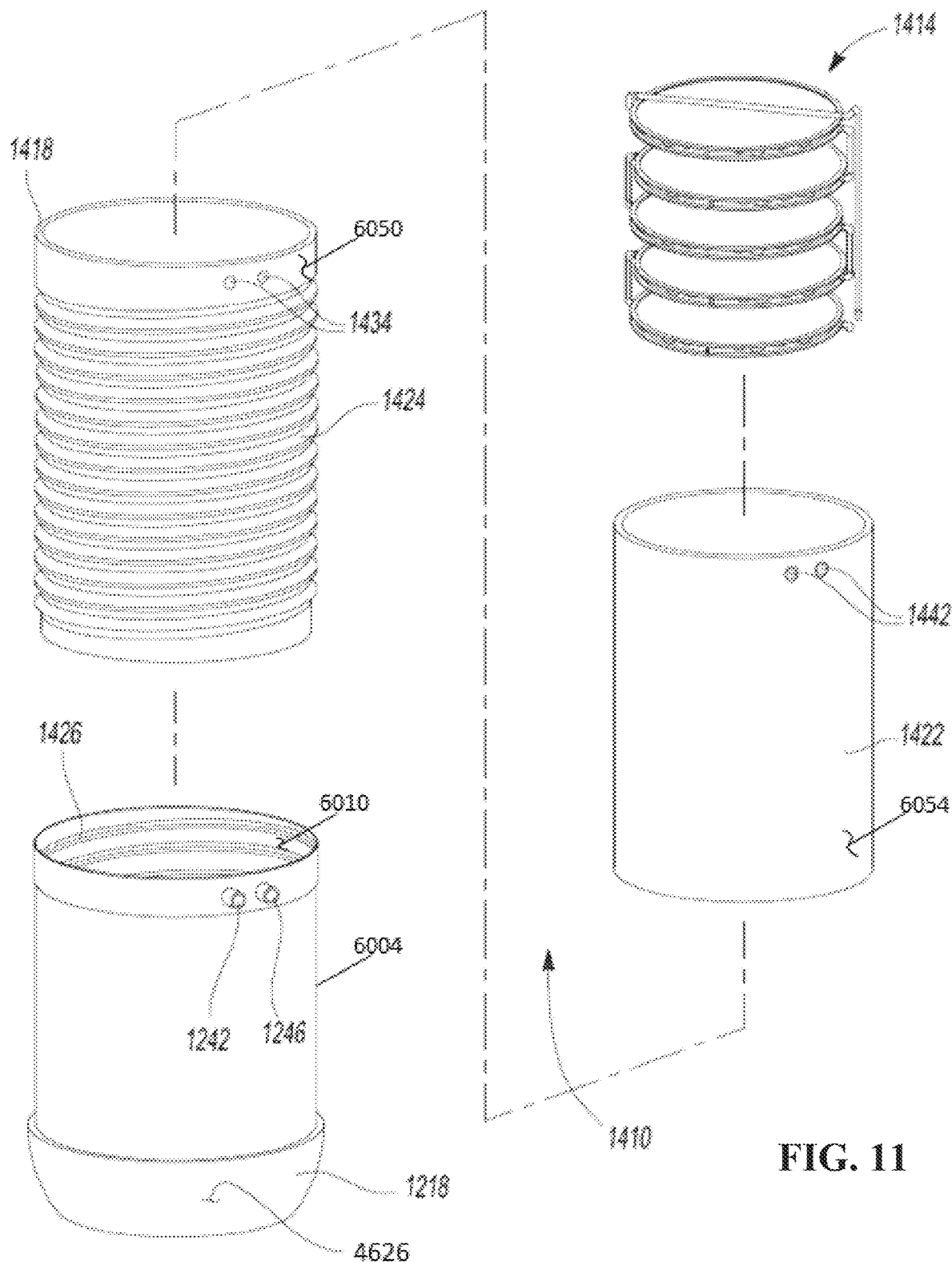
FIG. 11 is an exploded view of a sleeve assembly 1410.

As shown in FIG. 11, the vessel 1022 may also include a sleeve assembly 1410. The sleeve assembly 1410 comprises a sleeve 1418 and an inner liner 1422. The sleeve 1418 is of an open cylindrical shape and a diameter slightly less than the diameter of the segments 6160, 6162 such that the sleeve 1418 may be inserted into the segments 6014, 6016, 6160, 6162. The sleeve 1418 has a first external surface 6050 which has seventh threading 1424. The segments 6160, 6162 may have eighth threading on the first interior surface 6010 which negatively corresponds to the seventh threading 1424 of the sleeve 1418. Thus, the sleeve 1418 can be screwed into the segments 6014, 6016, 6160, 6162.

The sleeve 1418 includes a pair of second apertures 1434. Each second aperture 1434 aligns with one of the ports 1242 of the segment. As shown in FIG. 12, a second internal surface 6052 of the sleeve 1418 defines a plurality of slots 1430 that extend parallel to axis A.

Figure 10:
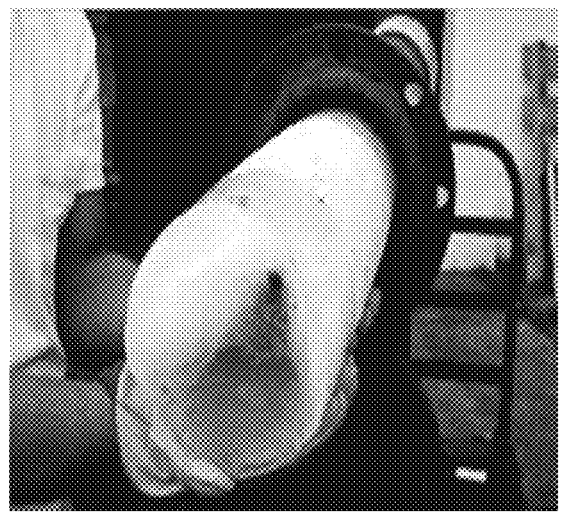
FIG. 10 is picture showing an example of a plug.

During freeze-drying, the chamber 1230 is filled with a solid cylinder of carbon dioxide and the material to be freeze-dried. The solid cylinder is known as a plug. An example plug is shown in FIG. 10. The plug is housed within the sleeve 1418. The sleeve 1418 is configured to be easily and quickly removable from the chamber 1230 so that an operator may easily and quickly remove the plug from the chamber 1230.

As best shown in FIGS. 11 and 12, an inner liner 1422 is of an open cylindrical shape and has a second external surface 6054 that defines a plurality of splines 1438. The splines 1438 can slidably fit within the slots 1430 such that the inner liner 1422 can slide coaxially into the sleeve 1418 and such that the inner liner 1422 is constrained from rotating relative to the sleeve 1418. The slots 1430 and splines 1438 can have a loose slip fit, such that thermal expansion/contraction of the inner liner 1422 and the sleeve 1418 does not inhibit the sliding of the inner liner 1422. The inner liner 1422 includes a pair of third apertures 1442 that align with the second apertures 1434 of the sleeve 1418. In an alternative embodiment not specifically shown, the sleeve 1418 can have a plurality of splines 1438 that extend radially inward to mate with matching slots 1430 on the inner liner 1422.

The inner liners 1422 of adjacent segments 6160, 6162 abut when fully assembled such that adjacent inner liners 1422 form a continuous barrier between the chamber 1230 and the sleeve 1418 and/or the segments 6014, 6016, 6160, 6162.

The inner liner 1422 is made of stainless steel which does not shrink in cryogenic conditions, enables the vessel 1022 to maintain a sterile environment within the inner liner 1422, and enables the vessel 1022 to meet FDA hygiene requirements for food processing. The rest of the vessel 1022 may be made of cheaper materials such as steel, copper, or aluminum.

Radiator 1414

Figure 13:
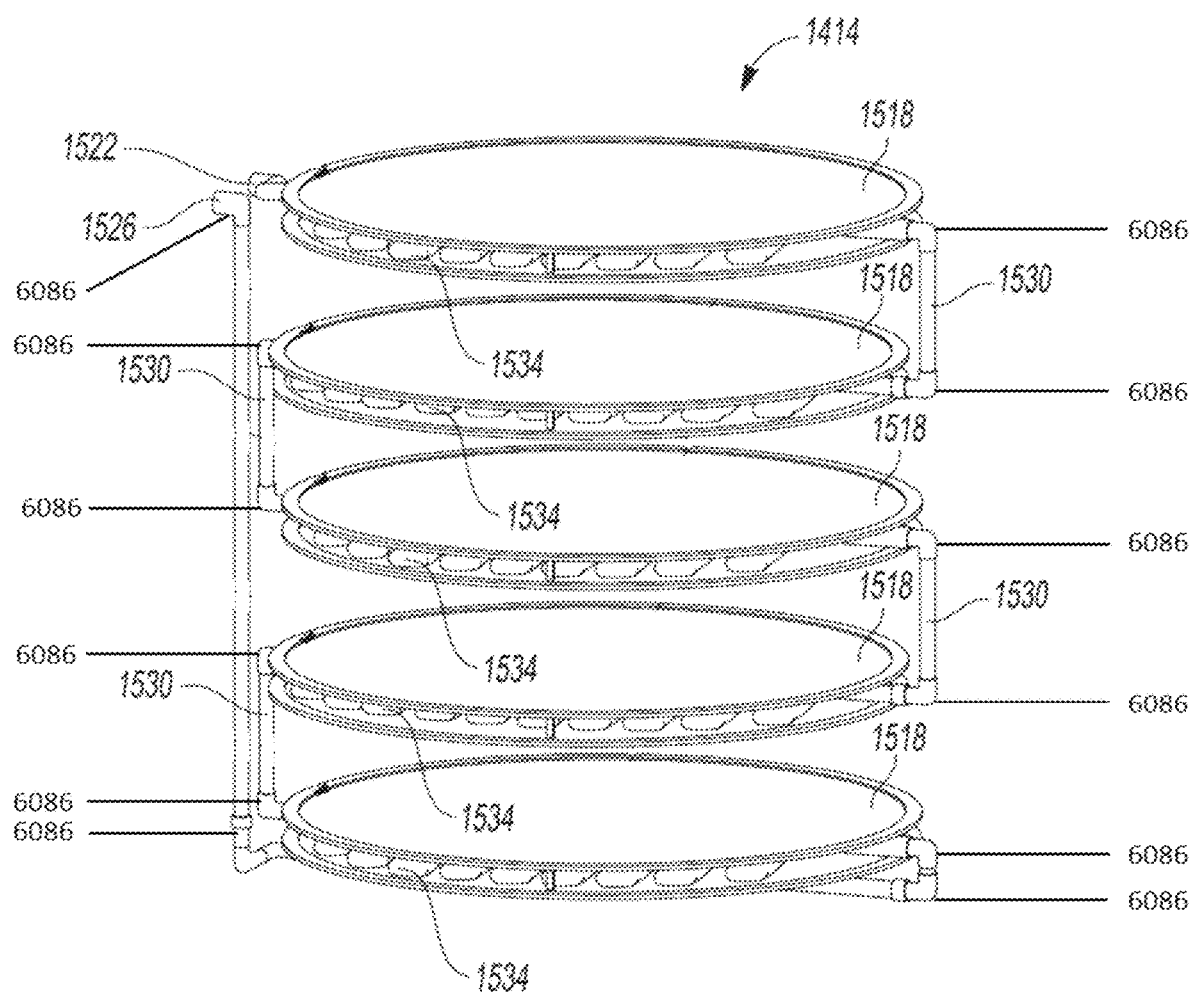
FIG. 13 is a perspective view of a radiator 1414.

With reference to FIG. 13, the extractor 1010 also comprises a radiator 1414, generally indicated, disposed in the chamber 1230. The radiator 1414 comprises a plurality of first cooling coils 1534 in fluid communication with and vertically spaced from each other by connecting-tubes 1530. The radiator 1414 has an inlet 1522 and an outlet 1526 and is configured such that fluid can enter the inlet 1522, flow through all of the first cooling coils 1534, then exit through the outlet 1526. The inlet 1522 aligns with one of the ports 1242 segments 6014, 6016, 6160, 6162. The outlet 1526 aligns with another one of the ports 1242 segments 6014, 6016, 6160, 6162. Quick connect fittings 6086, are connected to the inlet 1522 and the outlet 1526 such that the radiator 1414 may be easily and quickly removed from the chamber 1230. Quick connect fittings 6086 may also be connected to the first cooling coils 1534 and the connector-tubes such that the radiator 1414 can be easily and quickly assembled and disassembled. Disposed both above and below each cooling coil are disks 1518 of porous material such as a metal mesh. The material to be dried during freeze-drying can be placed on the disks 1518.

Cooling/Heating System 1166, 1170

As best shown in FIG. 14A, a cooling system 1166 and a heating system 1170 are composed of a cover 1162 disposed around each segment. The cover 1162 is of a hollow cylindrical shape oriented along axis A. The cover 1162 thermally insulates the segment. The segment and the cover 1162 define an annular space 6088 between them that is closed off to the surrounding environment. A second cooling coil 1714 is wrapped around each segment, excluding the male and female subs 1218, 1214, which must be available for mating, and the pair of ports 1242. FIG. 14A shows the second cooling coil 1714 wrapped around a male segment 6160. FIG. 14B shows the second cooling coil 1714 wrapped around a female segment 6162. The second cooling coil 1714 has a second inlet 1718 and a second outlet 1722. The second inlet 1718 extends through the cover 1162 and may receive fluid suitable for cooling the vessel 1022, such as liquid nitrogen or liquid helium, from the recycle system 6000.

A second valve 1726 of the 3-way type is in fluid communication with the outlet 1526. The second valve 1726 has a closed mode, a first open mode, and a second open mode. In the closed mode, the second valve 1726 prevents fluid flow through the outlet 1526. In the first open mode, the second valve 1726 directs fluid flow from the second cooling coil 1714 to the annular space 6088. The cover 1162 has a third valve (not shown) which may be opened to release fluid from the annular space 6088. In the second open mode, the second valve 1726 directs fluid flow from the second cooling coil 1714 to the surrounding environment, an expansion tank 1118, or to be recycled back to the second cooling coil 1714. Alternatively the second valve 1726 may be one way, serving to open and close the outlet 1526 and the outlet 1526 may release fluid into either the surroundings or the annular space 6088.

A heating component 1730 of electric resistance type, such as heating tape or heating pads, is disposed about each segment. The heating component 1730 may be in direct contact (e.g. wrapped around) the segment, the second cooling coil 1714, or a combination of the two.

The second valve 1726, the third valve, and the heating component 1730 may be controlled by the controller 1018.

Recycle System 6000

The recycle system 6000 comprises an expansion tank 1118, a compressor 1122, a reservoir 6142, and a controller 1018. The expansion tank 1118 separates CO2 from other materials. The expansion tank 1118 receives fluids from the vessel 1022 through a first conduit (not shown) connected to the bottom 6020 of the vessel 1022. The expansion tank 1118 provides CO2 to the compressor 1122 through a second conduit 1834. The compressor 1122 pressurizes the CO2 to make it transition to a supercritical state. The compressor 1122 provides sCO2 to the vessel 1022 proximate to the top 6018 of the vessel 1022 via the third conduit. The compressor 1122 can be any pump able to compress CO2 in liquid, gas, or supercritical state. Optionally, a heating element and/or a pressure relief valve may be in/on the third conduit to heat the sCO2 and thereby raise the pressure of the sCO2 to a pressure above the pressure inside the vessel 1022. The reservoir 6142 may contain pressurized fluids such as carbon dioxide. The controller 1018, compressor 1122, separator tank 1118, and reservoir 6142 can be fixedly mounted to the first cart 1026 or the support frame 1158.

The recycle system 6000 may also include a pumping station 1014 which pumps fluids, such as carbon dioxide, into the vessel 1022. The pumping station 1014 may also receive fluids from the vessel 1022 to recycle back into the vessel 1022.

The controller 1018 may be a PLC or touch screen device. The controller 1018 displays status of the extractor 1010 and receives input commands to control the extractor 1010. The controller 1018 allows the vessel 1022 to achieve supercritical fluid state independently of traditional fixed pumping stations 1014. The controller 1018 can control operation of the compressor 1122, the heating element, charging/discharging valve as needed, the cooling and heating system 1166, 1170, the mixing device 1822, the ultrasonic transducer 1818, one or more mass flow meter, and an ultrasonic probe. The controller 1018 of one extractor 1010 may be coupled to controllers 1018 on other extractors 1010 (e.g., via wires, or wirelessly) to allow a multiple extractors 1010 to operate simultaneously while only using one pumping station 1014. Pumps capable of handling supercritical carbon dioxide are very expensive. Coordinating extractors 1010 so that multiple extractors 1010 may operate using one pump would decrease cost and allow production to increase cheaply.

First Cart 1026

Figure 15:
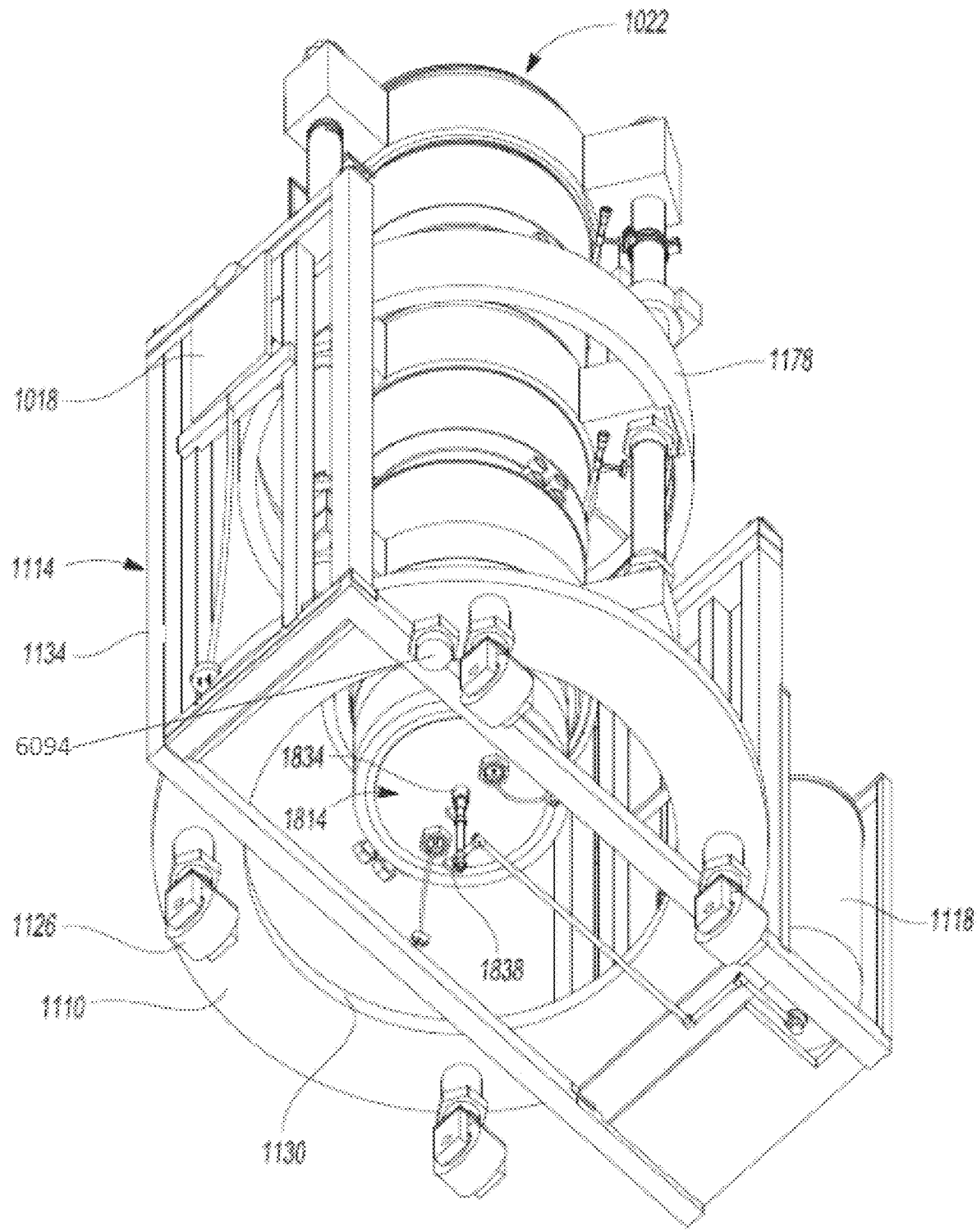
FIG. 15 is a perspective view of the extractor 1010 according to various embodiments.

The first cart 1026 supports the vessel 1022 and the recycle system 6000 and makes the extractor 1010 mobile. As best shown in FIG. 15, the first cart 1026 comprises a base 1110. The base 1110 is annular and defines a fourth aperture 1130 through which various conduits (not shown), 1834 and/or cords 6082, 6084 can extend. Four castors 1126 are equidistantly spaced around the base 1110. The castors 1126 allow the first cart 1026 to be rolled between locations. The first cart 1026 also comprises a second frame 1114 which is mounted to the underside 6092 of the base 1110 by at least one nut-and-bolt 6094. The second frame 1114 comprises a plurality of beams 1134 attached to each other to form the second frame 1114.

Second Cart 3018

Figure 16:
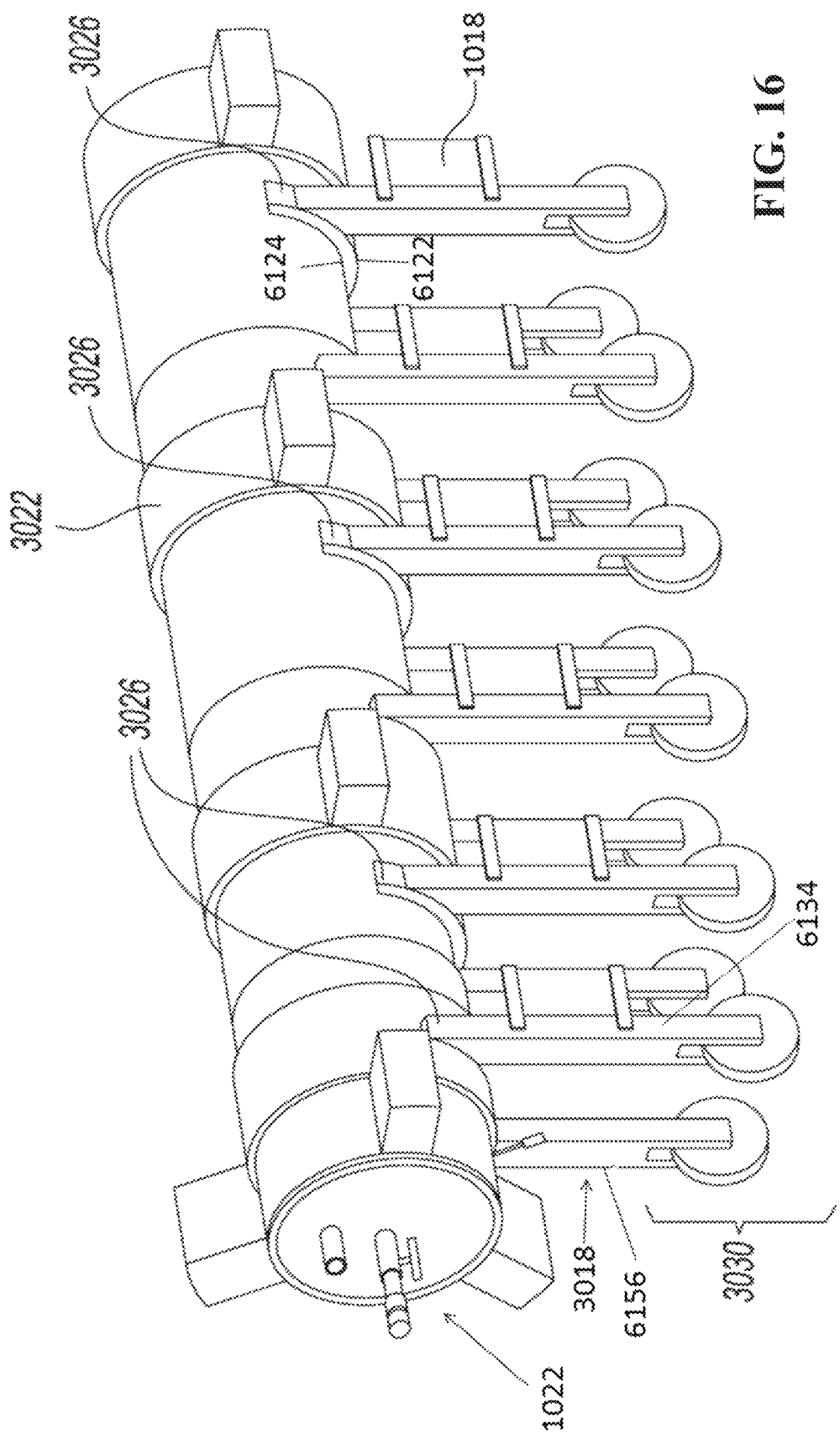
FIG. 16 is a perspective view of the extractor 1010 according to various embodiments.

Alternatively, the vessel 1022 may be permanently in the horizontal position and may be supported above the ground by a second cart 3018 shown in FIG. 16. The second cart 3018 comprises a plurality cradles 3026. Each cradle 3026 is of a semicircular shape and has a fifth side 6122 that is convex and a sixth side 6124 that is concave. The cradle 3026 is configured such that the cradle 3026 and the vessel 1022 are coaxial and the vessel 1022 sits in the fifth side 6122 and is partially enveloped by the cradle 3026. The second cart 3018 also comprises stands 6134, 6156 which extend from a cradle 3026 to a wheel 3030. A first stand 6134 and a second stand 6156 (and thus two wheels 3030) are attached to each cradle 3026 enabling the extractor 1010 to be mobile. A controller 1018 is attached to each first stand 6134.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A method of preserving a material, comprising the steps of:
   replacing a first fluid with a first non-gaseous fluid comprising primarily carbon dioxide, the first fluid being in contact with the material, and the material containing pores, wherein a plurality of the pores have diameters of less than 50 nm; and
   cooling the first non-gaseous fluid to cause the first non-gaseous fluid to freeze forming a solid;
   wherein the cooling is performed at a rate of at least 0.2° C./min.

2. The method of claim 1 wherein the cooling comprises transferring heat with a liquid circulating about the material.

3. The method of claim 1 wherein the rate of cooling is at least 0.5° C./min.

4. The method of claim 1 wherein the first fluid is a non-gaseous fluid.

5. The method of claim 4 wherein the replacing the first fluid with the first non-gaseous fluid comprises flushing the material with the first non-gaseous fluid.

6. The method of claim 4 comprising subliming the solid from the material.

7. The method of claim 6 comprising;
   reacting amines of the material comprising of one of primary amines, secondary amines, and a combination of primary and secondary amines with carbon dioxide to form carbamate groups, and
   forming amines by subliming carbon dioxide from the material.

8. The method of claim 6 including;
   preserving a material containing at least one pore comprises;
   subjecting the material to an impregnating agent with the impregnating agent being non-gaseous at the temperature and pressure conditions at which carbon dioxide is sublimed and with the impregnating agent being soluble in at least one of liquid and supercritical carbon dioxide, and
   depositing the impregnating agent into at least one pore in the material.

9. The method of claim 1 comprising;
   Forming a solid layer of the solid on and surrounding the material,
   then decreasing pressure about the material by expanding the first non-gaseous fluid to form a gas.

10. The method of claim 9 wherein the forming a solid layer on and surrounding the material comprises transferring heat with a liquid circulating about the material.

11. The method of claim 6, wherein, after subliming the solid from the material, at least a portion of the plurality of the pores retain diameters of less than 50 nm.

12. The method of claim 6, wherein at least a portion of the plurality of the pores have diameters of less than 2 nm.

13. The method of claim 12, wherein, after subliming the solid from the material, at least a part of the portion of the plurality of the pores retains a diameter of less than 2 nm.

14. The method of claim 1, wherein at least a portion of the plurality of the pores have diameters of less than 2 nm.

15. The method of claim 1, wherein the solid is amorphous carbon dioxide.

16. The method of claim 1, further comprising:
   preventing a gas-liquid interface from forming in contact with the material.

17. The method of claim 1 including submerging the material in the first non-gaseous fluid comprising primarily carbon dioxide, cooling the first non-gaseous fluid while the material is submerged in the first non-gaseous fluid to cause the first non-gaseous fluid to freeze and form a solid; and subliming the solid.

* * * * *